(12) United States Patent
Wang et al.

(10) Patent No.: US 10,798,138 B2
(45) Date of Patent: Oct. 6, 2020

(54) INSTANT CALLING METHOD, APPARATUS AND SYSTEM

(71) Applicant: TENCENT TECHNOLOGY (SHENZHEN) COMPANY LIMITED, Shenzhen, Guangdong (CN)

(72) Inventors: Xinliang Wang, Shenzhen (CN); Bin Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 100 days.

(21) Appl. No.: 15/759,301

(22) PCT Filed: Jan. 25, 2017

(86) PCT No.: PCT/CN2017/072591
§ 371 (c)(1),
(2) Date: Mar. 12, 2018

(87) PCT Pub. No.: WO2017/129129
PCT Pub. Date: Aug. 3, 2017

(65) Prior Publication Data
US 2018/0255112 A1 Sep. 6, 2018

(30) Foreign Application Priority Data

Jan. 29, 2016 (CN) .......................... 2016 1 0066519

(51) Int. Cl.
*H04L 29/06* (2006.01)
(52) U.S. Cl.
CPC .......... *H04L 65/403* (2013.01); *H04L 65/102* (2013.01); *H04L 65/103* (2013.01); *H04L 65/1069* (2013.01); *H04L 65/601* (2013.01)

(58) Field of Classification Search
CPC ....... H04M 3/561; H04M 3/567; H04L 29/06; H04L 65/1069; H04L 65/403; H04L 12/1813
See application file for complete search history.

(56) References Cited

U.S. PATENT DOCUMENTS 6,763,226 B1   7/2004 McZeal, Jr.
6,975,596 B1 * 12/2005 Kaiser .................... H04M 7/00
                                                      370/254
(Continued)

FOREIGN PATENT DOCUMENTS

CN   101068238 A   11/2007
CN   102843784 A   12/2012
(Continued)

OTHER PUBLICATIONS

International Search Report of PCT/CN2017/072591 dated Apr. 6, 2017 [PCT/ISA/210].
(Continued)

*Primary Examiner* — Hassan A Phillips
*Assistant Examiner* — Prenell P Jones
(74) *Attorney, Agent, or Firm* — Sughrue Mion, PLLC

(57) ABSTRACT

A real-time call method performed by a calling side, the calling side being a Voice over Internet Protocol (VoIP) terminal, includes: initiating a multi-party voice call request to a signaling server, wherein terminals that are specified in the multi-party voice call request includes a telephone terminal; establishing a data channel according to a remote access address returned by the signaling server in response to the multi-party voice call request; and performing a multi-party voice call based on establishment of data channels of the terminals according to the remote access address, (Continued)

wherein the telephone terminal establishes a data channel according to the remote access address by using a gateway device.

31 Claims, 12 Drawing Sheets

(56) References Cited

U.S. PATENT DOCUMENTS

| | | | | |
|---|---|---|---|---|
| 9,094,519 | B1* | 7/2015 | Shuman | H04M 3/54 |
| 9,537,906 | B2* | 1/2017 | Rosenberg | H04L 29/06027 |
| 2008/0037534 | A1* | 2/2008 | Shina | H04M 3/4938 |
| | | | | 370/389 |
| 2008/0119165 | A1* | 5/2008 | Mittal | H04L 29/06027 |
| | | | | 455/411 |
| 2010/0085959 | A1* | 4/2010 | Vohra | H04L 65/1046 |
| | | | | 370/352 |
| 2010/0246788 | A1* | 9/2010 | Menard | H04M 3/56 |
| | | | | 379/159 |
| 2011/0173541 | A1* | 7/2011 | Carlson | H04L 67/36 |
| | | | | 715/735 |
| 2013/0208683 | A1* | 8/2013 | Yuen | H04W 76/10 |
| | | | | 370/329 |
| 2013/0266126 | A1* | 10/2013 | Dunne | H04M 3/2227 |
| | | | | 379/32.01 |
| 2014/0100961 | A1* | 4/2014 | Lee | G06Q 30/0267 |
| | | | | 705/14.64 |
| 2015/0229770 | A1* | 8/2015 | Shuman | H04M 3/54 |
| | | | | 379/211.02 |
| 2018/0359811 | A1* | 12/2018 | Verzun | H04L 12/28 |

FOREIGN PATENT DOCUMENTS

| | | |
|---|---|---|
| CN | 105656915 A | 6/2016 |
| WO | 2011/018362 A1 | 2/2011 |

OTHER PUBLICATIONS

Written Opinion in International Application No. PCT/CN2017/072591, dated Apr. 6, 2017.

Communication dated May 29, 2020, from the Intellectual Property Office of India in Application No. 201827012439.

* cited by examiner

INSTANT CALLING METHOD, APPARATUS AND SYSTEM

CROSS REFERENCE TO RELATED APPLICATION

This application is a U.S. national stage application under 35 USC 371 of International Application No. PCT/CN2017/072591, filed on Jan. 25, 2017 in the Chinese Patent Office, which claims priority from Chinese Patent Application No. 201610066519.9, filed on Jan. 29, 2016 in the Chinese Patent Office, the disclosures of which are incorporated herein by reference in their entireties.

BACKGROUND

1. Field

Methods, apparatuses and systems consistent with exemplary embodiments relate to mobile Internet application technologies, and more particularly, to an instant calling (or real-time call) method, apparatus, and system.

2. Description of the Related Art

With the popularization of Voice over Internet Protocol (VoIP) applications, users communicate with each other over a telephone network with telephone terminals, and may further run VoIP applications on terminal devices that can access Internet to implement a two-party voice call between terminal devices or a multi-party voice call among terminal devices.

As can be seen, an existing call may be implemented between telephone terminals or between VoIP terminals. However, intercommunication cannot be implemented between a telephone terminal and a VoIP terminal.

Specifically, a telephone network and the Internet are independent of each other. For example, a telephone network is operated by an operator, whereas the Internet is provided by an Internet provider. Therefore, the telephone network and the Internet are unrelated to each other. As a result, the intercommunication between a telephone terminal and a VoIP terminal cannot be performed, and further, a multi-party voice call that a telephone terminal and a VoIP terminal join cannot be implemented.

SUMMARY

One or more exemplary embodiments resolve problems in the existing technology that a Voice over Internet Protocol (VoIP) terminal and a telephone terminal cannot intercommunicate with each other and a multi-party voice call that a telephone terminal and a VoIP terminal join cannot be implemented.

To resolve the foregoing technical problem, the following technical solutions are provided.

One or more exemplary embodiments provide a real-time call (or instant calling) method, apparatus, and system. The real-time call method, apparatus, and system can implement the intercommunication between a VoIP terminal and a telephone terminal and implement a multi-party voice call that a telephone terminal and a VoIP terminal join.

According to an aspect of an exemplary embodiment, there is provided a real-time call method performed by a calling side, the calling side being a Voice over Internet Protocol (VoIP) terminal, the method including: initiating a multi-party voice call request to a signaling server, wherein terminals that are specified in the multi-party voice call request include a telephone terminal; establishing a data channel according to a remote access address returned by the signaling server in response to the multi-party voice call request; and performing a multi-party voice call based on establishment of data channels of the terminals according to the remote access address, wherein the telephone terminal establishes a data channel according to the remote access address by using a gateway device.

According to another aspect of an exemplary embodiment, there is provided a real-time call method performed by a Voice over Internet Protocol (VoIP) terminal on a called side, the method including: responding to a multi-party voice call request forwarded by a signaling server, to obtain a remote access address, wherein terminals that are specified in the multi-party voice call request include a telephone terminal; and establishing a data channel of the VoIP terminal according to the remote access address, wherein the terminals specified in the multi-party voice call request enter a multi-party voice call based on establishment of data channels according to the remote access address.

According to still another aspect of an exemplary embodiment, there is provided a real-time call method performed by a signaling server, the method including: receiving a multi-party voice call request initiated by a calling side; returning a remote access address to the calling side in response to the multi-party voice call request, and initiating, to terminals specified in the multi-party voice call request, signaling exchange for establishing a call, the specified terminals including a telephone terminal; and returning the remote access address to a gateway device corresponding to a Voice over Internet Protocol (VoIP) terminal and/or the telephone terminal included in the specified terminals by using the signaling exchange, to establish a multi-party voice call.

According to still another aspect of an exemplary embodiment, there is provided a real-time call apparatus, the apparatus running on a calling side, the calling side being a Voice over Internet Protocol (VoIP) terminal, and the apparatus including at least one processor to implement: a request initiation module, configured to initiate a multi-party voice call request to a signaling server, terminals that are specified in the multi-party voice call request including a telephone terminal; a calling-side channel establishment module, configured to establish a data channel according to a remote access address returned by the signaling server in response to the multi-party voice call request; and a call execution module, configured to perform the multi-party voice call based on the specified terminals establishing data channels according to the remote access address, wherein the telephone terminal establishes a data channel corresponding to the remote access address by using a gateway device.

According to still another aspect of an exemplary embodiment, there is provided a real-time call apparatus, the apparatus running on a Voice over Internet Protocol (VoIP) terminal on a called side, and the apparatus including at least one processor to implement: a request response module, configured to respond to a multi-party voice call request forwarded by a signaling server, to obtain a remote access address, wherein terminals that are specified in the multi-party voice call request include a telephone terminal; and a called-side channel establishment module, configured to establish a data channel of the VoIP terminal according to the remote access address, wherein the terminals specified in the multi-party voice call request enter the multi-party voice call based on establishment of data channels according to the remote access address.

According to still another aspect of an exemplary embodiment, there is provided a real-time call system, including: a request receiving module configured to receive a multi-party voice call request initiated by a calling side; a call request response module configured to: return a remote access address to the calling side in response to the multi-party voice call request, and initiate, to terminals specified in the multi-party voice call request, signaling exchange for establishing a call, the specified terminals including a telephone terminal; and a call establishment module configured to return the remote access address to a gateway device corresponding to a Voice over Internet Protocol (VoIP) terminal and/or the telephone terminal included in the specified terminals by using the signaling exchange, to establish a multi-party voice call.

According to still another aspect of an exemplary embodiment, there is provided a real-time call system, including terminals capable of joining a multi-party voice call, the terminals including Voice over Internet Protocol (VoIP) terminals and a telephone terminal, the system further including: a VoIP terminal configured to initiate a multi-party voice call request to the signaling server; a signaling server configured to return a remote access address of a data server to the VoIP terminal that initiates the multi-party voice call request, initiate, to another terminal in the multi-party voice call, signaling exchange for establishing a call, and return the remote access address to a gateway device corresponding to another VoIP terminal and/or the telephone terminal by using the signaling exchange; and the gateway device corresponding to the VoIP terminals and/or the telephone terminal configured to establish data channels with the data server by using the remote access address, to perform the multi-party voice call.

BRIEF DESCRIPTION OF THE DRAWINGS

These and/or other aspects of the disclosure will become apparent and more readily appreciated from the following description of the exemplary embodiments, taken in conjunction with the accompanying drawings, in which.

DETAILED DESCRIPTION

Figure 1:
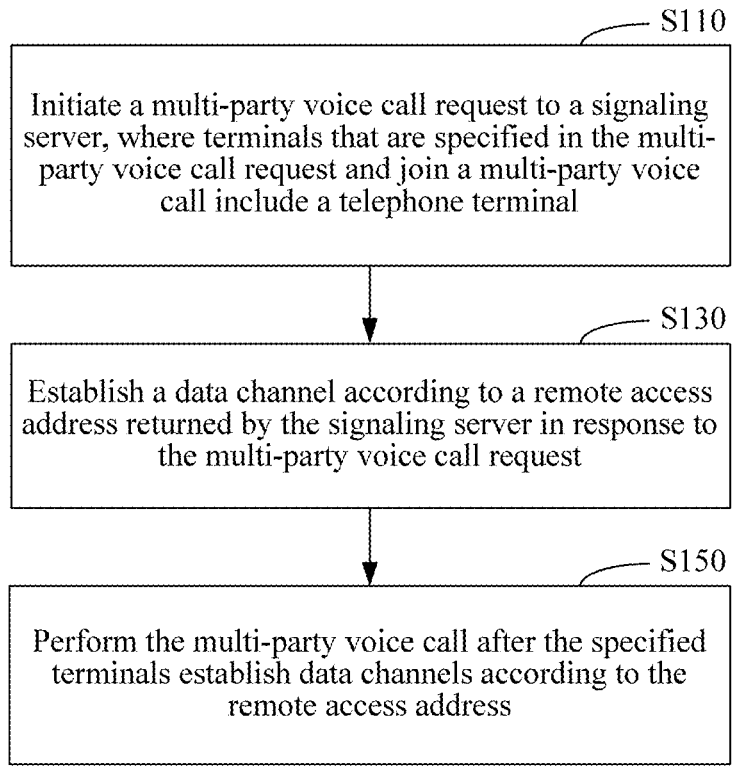
FIG. 1 is a flowchart of a real-time call method in an exemplary embodiment.

In order to make objectives, features, and advantages of the disclosure more clear, the technical solutions in the exemplary embodiments of the disclosure will be clearly and completely described in the following with reference to the accompanying drawings. It is obvious that the exemplary embodiments to be described below are only some rather than all of the embodiments of the disclosure. All other embodiments that can be obtained by persons skilled in the art based on the embodiments of the disclosure shall fall within the protection scope of the disclosure.

It should be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Terms described herein are selected by considering functions in the embodiment and meanings may vary depending on, for example, a user or operator's intentions or customs. Therefore, in the following embodiments, when terms are specifically defined, the meanings of terms should be interpreted based on definitions, and otherwise, should be interpreted based on general meanings recognized by those skilled in the art.

As used herein, the singular forms are intended to include the plural forms as well, unless the context clearly indicates otherwise. It will be further understood that the terms "comprises" and/or "comprising," or "includes" and/or "including" when used in this description, specify the presence of stated features, numbers, steps, operations, elements, components or combinations thereof, but do not preclude the presence or addition of one or more other features, numbers, steps, operations, elements, components or combinations thereof.

The "unit" or "module" used herein may be a hardware component such as a processor or a circuit, and/or a software component that is executed by a hardware component such as a processor.

As discussed above, a call on a telephone terminal is absolutely isolated from a call on a Voice over Internet Protocol (VoIP) terminal, and the telephone terminal and the VoIP terminal cannot intercommunicate with each other from the perspectives of both networking and technical implementations.

In an aspect, in networking, as discussed above, a telephone network and the Internet are independent of each other and are unrelated to each other. Therefore, the interconnection between a telephone terminal that relies on the telephone network and a VoIP terminal that relies on the Internet cannot be implemented in networking.

In another aspect, in technical implementations, in a telephone network, a call on a telephone terminal involves a transmission path, a protocol, a data implementation, and a communications interface that all comply with particular standards. Therefore, terminals in the telephone network of the call have desirable interconnectivity. A VoIP terminal uses various customized protocols in a VoIP application running on the VoIP terminal to accomplish call establishment and a data implementation. Therefore, the VoIP terminal can perform a call by using the running VoIP application.

However, in the related art, because technical implementations such as protocols and data implementations are different, it is difficult to implement the intercommunication between a VoIP terminal and a telephone terminal in technical implementations, and further a multi-party voice call that a VoIP terminal and a telephone terminal join cannot be performed.

To solve these problems, according to exemplary embodiments, a real-time call method is provided, to implement the intercommunication between a VoIP terminal and a telephone terminal, and to further implement a multi-party voice call that a VoIP terminal and a telephone terminal join.

In an exemplary embodiment, the real-time call method is performed by a calling side, and the calling side is a VoIP terminal. As shown in FIG. 1, the real-time call method includes steps S110 to S150.

Step S110: Initiate a multi-party voice call request to a signaling server, where terminals that are specified in the multi-party voice call request and join a multi-party voice call include a telephone terminal.

Any VoIP terminal may serve as a party on a calling side. After the terminals that join the multi-party voice call are specified, the multi-party voice call request may be initiated to the signaling server. The specified terminals that join the multi-party voice call serve as parties on a called side, and include any one telephone terminal or any combination of telephone terminals, and may further include one or more VoIP terminals. The multi-party voice call means a call process implemented by combining two types of terminals, that is, a VoIP terminal and a telephone terminal. In the call process, the VoIP terminal uses a VoIP application running on the VoIP terminal to perform a call with the telephone terminal.

In a VoIP terminal serving as a party on a calling side, a user specifies several number identifiers in a running VoIP application to specify several terminals as parties on a called side to join a multi-party voice call that is to be initiated. A process of specifying a number identifier in the VoIP application may be a dialing process.

The signaling server serves as a remote server matching a terminal, and is configured to implement signaling exchange, so as to control establishment of a multi-party voice call.

The multi-party voice call request initiated to the signaling server includes a terminal system type of the VoIP terminal on the calling side, network type information, hardware information, a service identifier, identification information, and number identifiers. The number identifiers include a calling number identifier and a called number identifier.

According to the multi-party voice call request, a currently initiated service of a multi-party voice call may be obtained, multiple applications in the VoIP terminal may further support a multi-party voice call function, and a multi-party voice call may be applied to various service scenarios.

Step S130: Establish a data channel according to a remote access address returned by the signaling server in response to the multi-party voice call request.

After receiving the multi-party voice call request, the signaling server correspondingly returns the remote access address to the VoIP terminal. The returned remote access address is an address of a server. The server is configured to control the transmission of data streams in a multi-party voice call.

It should be noted that the server and the signaling server may be a same server, or the server may be another server different from the signaling server. Specifically, the layout of the server and the signaling server may be flexibly configured according to an actual requirement.

The VoIP terminal that initiates the multi-party voice call request directly establishes a data channel with the server according to the remote access address. The data channel is used to implement the transmission of a data stream related to the VoIP terminal. Specifically, the data stream may include a data stream generated as the VoIP terminal sends an input to the server or a data stream that is returned by the server to the VoIP terminal and is from a terminal of the server.

As can be seen, the effect of the signaling server is to connect the terminals to the multi-party voice call, and the effect of a server corresponding to the remote access address is to relay generated data streams between the terminals in the multi-party voice call.

Step S150: Perform the multi-party voice call after the specified terminals establish data channels according to the remote access address.

During establishment of the data channels of the terminals, the telephone terminal establishes a data channel corresponding to the remote access address by using a gateway device.

After completing the establishment of the data channel, the VoIP terminal on the calling side further waits for a preset time until the specified terminals respond to the multi-party voice call request to establish data channels before the VoIP terminal can enter the multi-party voice channel.

Here, it should be particularly noted that while the VoIP terminal on the calling side waits for the preset time, one specified terminal or several specified terminals may complete the establishment of data channels, or all the specified terminals may complete the establishment of the data channels. In any of these cases, the multi-party voice call may be initiated.

In other words, after the VoIP terminal on the calling side establishes the data channel, any one terminal or any combination of terminals can join the multi-party voice call initiated by the VoIP terminal on the calling side provided that the terminal or the combination of terminals complete the establishment of data channels.

On the called side, a VoIP terminal may directly establish a data channel with a corresponding server according to a remote access address. Because a telephone network and the Internet are independent of each other, for a telephone terminal, a gateway device needs to serve as boundary device between the telephone network and the Internet. The gateway device establishes a data channel of the telephone terminal with the corresponding server according to the remote access address, so that a connection is established between the telephone terminal and the server by using the gateway device.

The telephone terminal includes a fixed-line phone and a mobile phone. To match the telephone terminal, the gateway device is a VoIP gateway. One side of the gateway device is connected to the telephone network, and the other side of the gateway device is connected to the Internet, so as to implement protocol and data conversion between the two networks, and further implement the intercommunication between the two networks.

Therefore, based on the gateway device, the interconnection between the telephone network and the Internet can be implemented, so as to implement a call between a VoIP terminal and a telephone terminal, or a telephone terminal can join a multi-party voice call performed by the VoIP terminal, so that the call boundaries and restrictions are removed.

By using the foregoing process, a voice call between a VoIP terminal and a telephone terminal is implemented, or even a multi-party voice call that multiple terminals including the telephone terminal join is included, so that a multi-party voice call function can be implemented even when the telephone terminal originally does not support the multi-party voice call function.

As it becomes increasingly convenient to access a mobile network of the Internet, bandwidth costs are reduced, and transmission quality is ensured, a multi-party voice call between a VoIP terminal and a telephone terminal can be implemented with great ease, and the implementation of a voice call is further no longer limited to only a telephone network, so that the implementation of calls is greatly extended.

Figure 2:
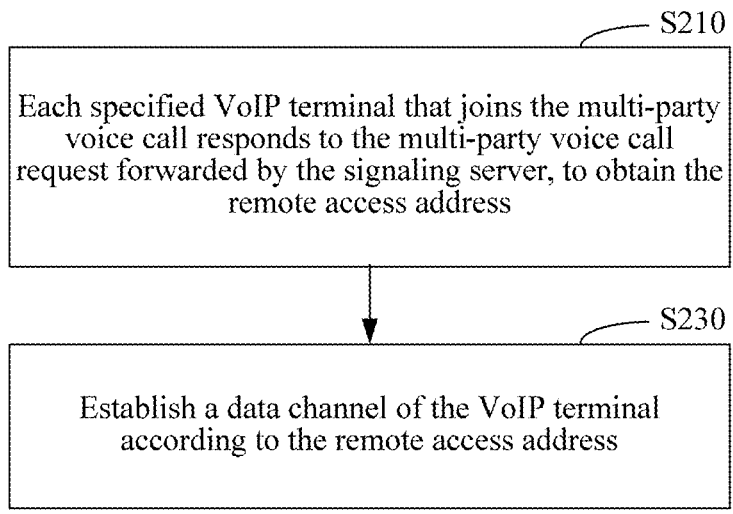
FIG. 2 is a flowchart of a real-time call method in another exemplary embodiment.

In an exemplary embodiment, as shown in FIG. 2, the foregoing method further includes steps S210 and S230.

Step S210: Each specified VoIP terminal that joins the multi-party voice call responds to the multi-party voice call request forwarded by the signaling server, to obtain the remote access address.

It may be understood that each specified VoIP terminal that joins the multi-party voice call is a party on the called side, and correspondingly, the forwarded multi-party voice call request is used as a call request for the VoIP terminal on the called side, so as to send ringing notification in the VoIP terminal on the called side and wait for a response.

Specifically, the VoIP terminal performs ringing after receiving the multi-party voice call request, so as to notify the initiated multi-party voice call.

In this case, a response made to ringing is a response to the multi-party voice call request, and includes answer, reject, and/or time-out disconnect. When an answer operation is detected, the VoIP terminal makes a response to obtain the remote access address returned by the signaling server.

Step S230: Establish a data channel of the VoIP terminal according to the remote access address.

After obtaining the remote access address, each specified VoIP terminal that joins the multi-party voice call establishes a respective data channel according to the remote access address, so as to further accordingly implement call establishment.

By using the foregoing process, when a network device on the calling side initiates a multi-party voice call, any VoIP terminal on the called side makes a response before the VoIP terminal can join a voice call between the calling side and the telephone terminal, so that a voice call has relatively high flexibility.

In an exemplary embodiment, the foregoing method further includes: receiving, by the VoIP terminals in the multi-party voice call, data streams transmitted on the data channels, performing adaptive audio mixing processing on the data streams, and playing the processed data streams.

That is, in the multi-party voice call that a VoIP terminal and a telephone terminal join, any VoIP terminal receives a data stream. The received data stream may be one data stream or multiple data streams. Therefore, adaptive audio mixing processing needs to be performed.

In an aspect, because a multi-party voice call is involved, for a VoIP terminal that receives a data stream by using a data channel established by the VoIP terminal, the data stream received by the VoIP terminal may be one data stream. For example, only one terminal may currently input a voice. However, there may be multiple data streams, that is, several terminals of other terminals or all of terminals that join a voice call input voices.

In another aspect, audio mixing of multiple data streams involved in the multi-party voice call is adaptively and dynamically switched between a remote end and a local end of a VoIP terminal. Therefore, when audio mixing has been performed at the remote end, the VoIP terminal definitely receives one data stream. When audio mixing has not been performed at the remote end, the VoIP terminal receives multiple data streams, and needs to perform audio mixing on the multiple data streams.

In the multi-party voice call, on both the calling side and the called side, on any VoIP terminal, a data stream can be played only after adaptive audio mixing processing of the data stream is completed, so as to output voices in the multi-party voice call.

The adaptive audio mixing processing includes a process of adaptively determining whether audio mixing has been performed on a data stream and an execution process based on an adaptive determining result.

This process is used to dynamically and adaptively support audio mixing on a remote server and local audio mixing on a terminal, so that the load of a server in a multi-party voice call is further reduced, and a delay in receiving a data stream by the VoIP terminal is shortened. Therefore, a current multi-party voice call implemented by using a telephone network and the Internet can have the timelines and smoothness similar to those in a call on a telephone network.

Figure 3:
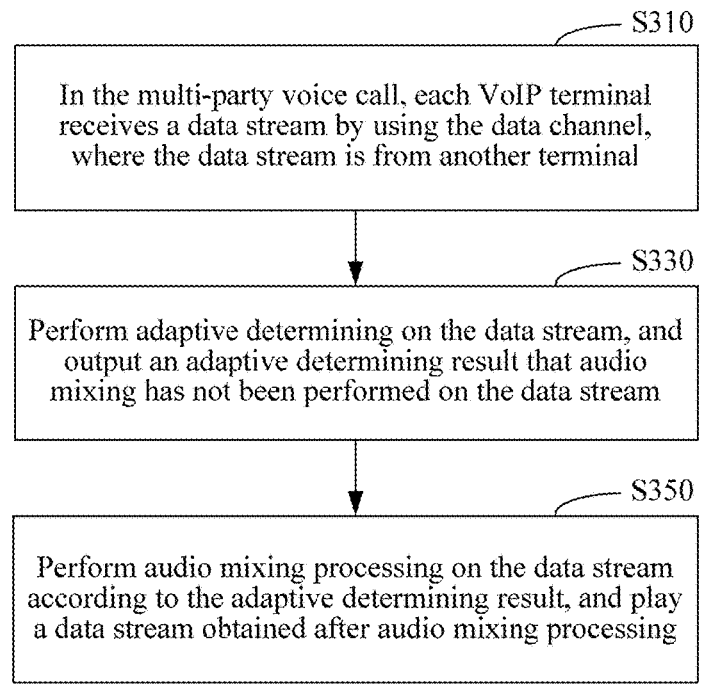
FIG. 3 is a flowchart of a method of Voice over Internet Protocol (VoIP) terminals in a multi-party voice call receiving data streams transmitted on data channels, performing adaptive audio mixing processing on the data streams, and playing the processed data streams in an exemplary embodiment.

Furthermore, in an exemplary embodiment, as shown in FIG. 3, the foregoing step of receiving, by the VoIP terminals in the multi-party voice call, data streams transmitted on the data channels, performing adaptive audio mixing processing on the data streams, and playing the processed data streams includes steps S310 to 350.

Step S310: In the multi-party voice call, each VoIP terminal receives a data stream by using the data channel, where the data stream is from another terminal.

As discussed above, the multi-party voice call is a call among multiple terminals. The multiple terminals include a VoIP terminal and a telephone terminal, and respective data channels are established.

After each terminal completes the establishment of a data channel to enter the multi-party voice call, the VoIP terminal receives a data stream by using the data channel established by the VoIP terminal, so as to acquire a voice input from another terminal currently.

Step S330: Perform adaptive determining on the data stream, and output an adaptive determining result that audio mixing has not been performed on the data stream.

The identification information identifies a terminal where the data stream is from. In addition, for a data stream on which server audio mixing has been performed, the identification information is further used to identify a destination terminal corresponding to the data stream, and the destination terminal is a terminal that is to receive the data stream.

In other words, for data streams on which server audio mixing has not been performed, any one data stream carries identification information that labels a terminal where the data stream is from. One data stream that is obtained after server audio mixing has been performed not only carries the identification information identifying a terminal where the data stream is from but also carries identification information of the corresponding destination terminal.

Therefore, for a data stream received by a VoIP terminal, carried identification information is used as a reference to perform adaptive determining.

Step S350: Perform audio mixing processing on the data stream according to the adaptive determining result, and play a data stream obtained based on audio mixing processing.

When an adaptive determining result that audio mixing has not been performed on the data stream is output, local terminal audio mixing is performed on the VoIP terminal, so as to superimpose received data streams to obtain one data stream and then play the data stream, thereby outputting voices in the multi-party voice call.

The foregoing processes of adaptive determining and audio mixing processing provide a specific implementation of dynamic and adaptive switching between server audio mixing and local terminal audio mixing, thereby further enhancing the flexibility of data implementations in a multi-party voice call.

Figure 4:
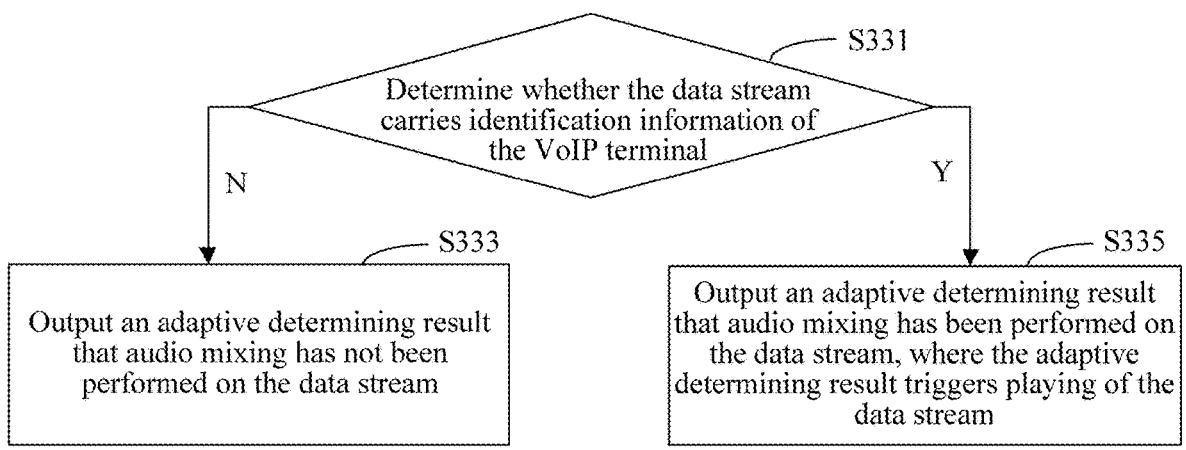
FIG. 4 is a flowchart of a method of performing adaptive determining on a data stream and outputting an adaptive determining result that audio mixing has not been performed on the data stream in FIG. 3.

Furthermore, in an exemplary embodiment, as shown in FIG. 4, step S330 includes steps S331 to 335.

Step S331: Determine whether the data stream carries identification information of the VoIP terminal, and if not, the process turns to step S333, or if yes, the process turns to step S335.

For a VoIP terminal that receives a data stream, it is determined whether any received data stream carries identification information of the VoIP terminal. If yes, it indicates that the data stream is transmitted after server audio mixing, and accordingly an adaptive determining result that audio mixing has been performed on the data stream is correspondingly output. Otherwise, an adaptive determining result that audio mixing has not been performed on the data stream is output.

Step S333: Output an adaptive determining result that audio mixing has not been performed on the data stream.

Step S335: Output an adaptive determining result that audio mixing has been performed on the data stream, where the adaptive determining result triggers playing of the data stream.

As discussed above, identification information and a number identifier are involved in a multi-party voice call. The identification information is used to identify a terminal where the data stream is from and a destination terminal for which server audio mixing is performed. The number identifier is used to label a source terminal and a destination terminal corresponding to the transmission of the data stream. The destination terminals are discussed for a same data stream, and the destination terminals involved in the number identifier and the identification information are a same terminal.

In another exemplary embodiment, the foregoing method further includes: encoding, by any VoIP terminal in the multi-party voice call, inputting call data to obtain a data stream input by the VoIP terminal, and transmitting the data stream by using the established data channel.

In the multi-party voice call, any VoIP terminal inputs a voice. In this case, call data obtained from the input voice is encoded to form a data stream input by the VoIP terminal. The data stream needs to be transmitted by using a data channel established by the VoIP terminal to a server corresponding to the remote access address, and further under the control of the server, the data stream is delivered to multiple terminals that join the multi-party voice call.

That is, any VoIP terminal establishes a data channel corresponding to the VoIP terminal, and the data channel is used to implement the transmission of a data stream, thereby accordingly implementing the generation and transmission of a data stream of each VoIP terminal in the multi-party voice call.

By using the foregoing process, a VoIP terminal that can initiate a multi-party voice call and implement the transmission and processing of a data stream in the multi-party voice call is provided. In addition, a VoIP terminal that can join a multi-party voice call is further provided. A telephone terminal is connected to a multi-party voice call by using the gateway device, so as to form a multi-party voice call that is supported by the Internet and a telephone network, and a call can further be freely made between a VoIP terminal and a telephone terminal.

In addition, the support of the telephone terminal for a multi-party voice call is implemented by using a VoIP terminal. That is, the VoIP terminal initiates a multi-party voice call request, so that the telephone terminal, which originally does not support a multi-party voice call, can join a multi-party voice call initiated by the VoIP terminal, so that the functions of the telephone terminal are greatly extended.

Figure 5:
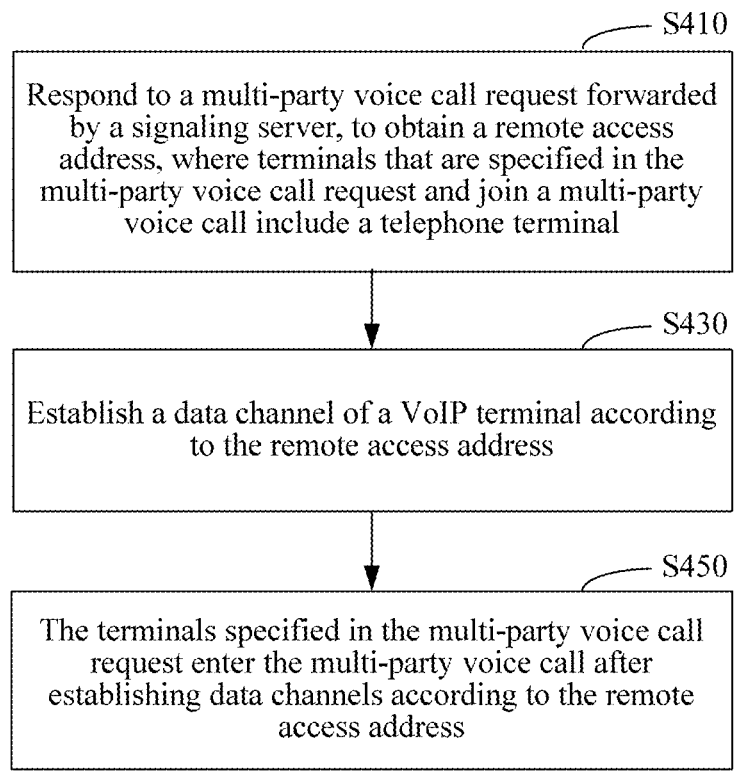
FIG. 5 is a flowchart of a real-time call method performed by a VoIP terminal on a called side in an exemplary embodiment.

In an exemplary embodiment, a real-time call method is further correspondingly provided. The method is performed by a VoIP terminal on a called side, and as shown in FIG. 5, includes steps S410 to 450.

Step S410: Respond to a multi-party voice call request forwarded by a signaling server, to obtain a remote access address, where terminals that are specified in the multi-party voice call request and join a multi-party voice call include a telephone terminal.

Step S430: Establish a data channel of the VoIP terminal according to the remote access address.

Step S450: The terminals specified in the multi-party voice call request enter the multi-party voice call after establishing data channels according to the remote access address.

By using the foregoing step, a process in which a VoIP terminal responds to a multi-party voice call request of another VoIP terminal to enter a multi-party voice call is implemented, and accordingly, any VoIP terminal that is on the called side makes a response by using the foregoing step to enter the multi-party voice call.

Figure 6:
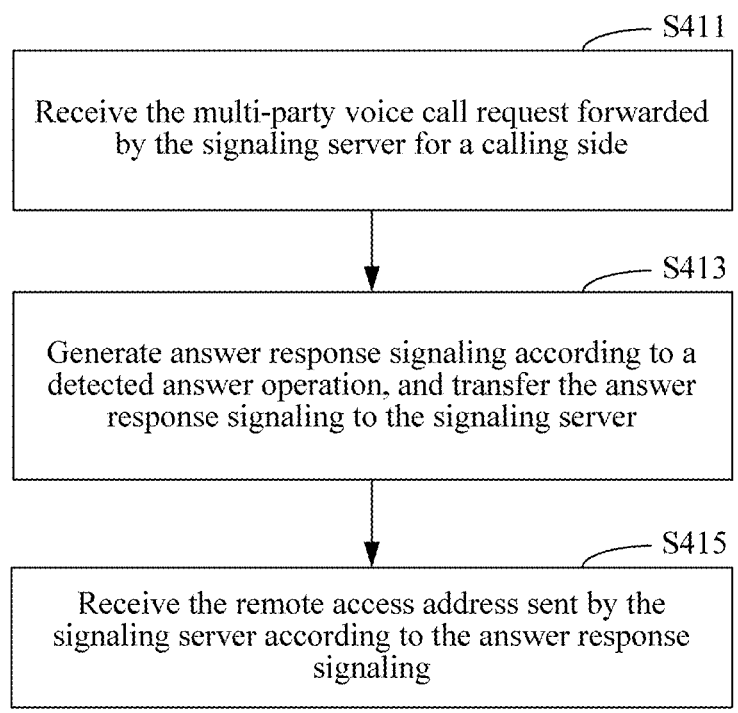
FIG. 6 is a flowchart of a method of responding to a multi-party voice call request forwarded by a signaling server, to obtain a remote access address in FIG. 5 according to an exemplary embodiment.

Furthermore, in an exemplary embodiment, as shown in FIG. 6, step S410 includes S411 to S415.

Step S411: Receive the multi-party voice call request forwarded by the signaling server for a calling side.

As discussed above, the signaling server is configured to control the establishment of a multi-party voice call. After receiving a multi-party voice call request, the signaling server forwards the multi-party voice call request according to a called number identifier carried in the multi-party voice call request.

Step S413: Generate answer response signaling according to a detected answer operation, and transfer the answer response signaling to the signaling server.

A VoIP terminal that receives a multi-party voice call request sends ringing notification. In this case, when a reject operation is detected, the current ringing notification is interrupted. When the ringing notification lasts till a timeout occurs, a disconnect operation is triggered, and the current ringing notification is interrupted. When the reject operation or the disconnect operation is triggered, the current process of establishing a multi-party voice call is stopped.

When an answer operation is detected during the current ringing notification, answer response signaling is generated and transferred to the signaling server.

Step S415: Receive the remote access address sent by the signaling server according to the answer response signaling.

After receiving the answer response signaling of the VoIP terminal, the signaling server delivers the remote access address to the VoIP terminal, and provides, by using the remote access address to the multi-party voice call performed by the VoIP terminal, a node that can relay a data stream, so that terminals in the multi-party voice call are connected by using the remote access address, and accordingly the multi-party voice call can be successfully performed.

Figure 7:
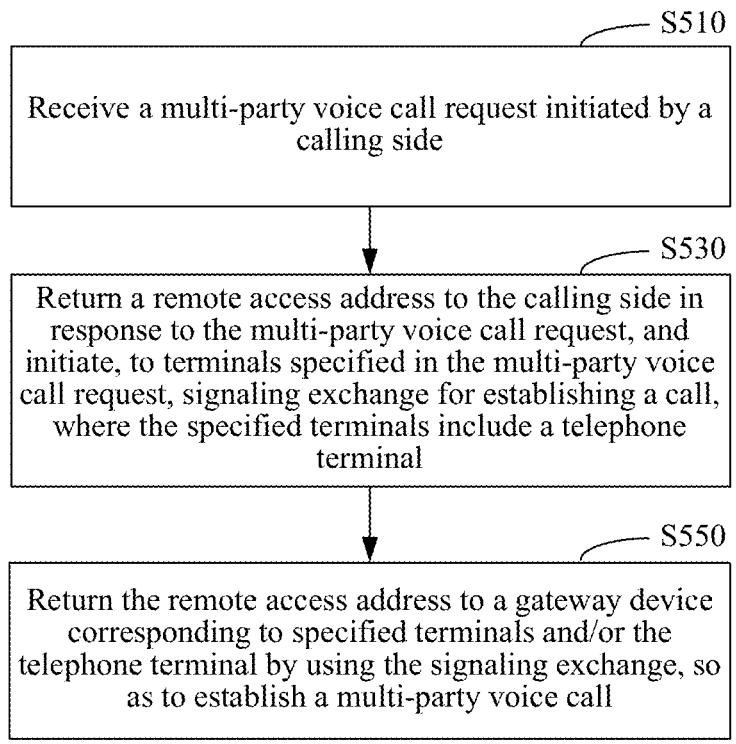
FIG. 7 is a flowchart of a real-time call method performed by a signaling server in an exemplary embodiment.

In an exemplary embodiment, a real-time call method is provided. The method is performed by a signaling server, and as shown in FIG. 7, includes steps S510 to S550.

Step S510: Receive a multi-party voice call request initiated by a calling side.

Relative to VoIP terminals on the calling side, the signaling server receives a multi-party voice call request initiated by any VoIP terminal, so as to acquire, according to identifier numbers carried in the multi-party voice call request, the VoIP terminal that initiates the multi-party voice call request and a specified VoIP terminal and a specified telephone terminal that join a multi-party voice call.

Step S530: Return a remote access address to the calling side in response to the multi-party voice call request, and initiate, to terminals specified in the multi-party voice call request, signaling exchange for establishing a call, where the specified terminals include a telephone terminal.

After receiving the multi-party voice call request, the signaling server responds to the calling side and also responds to a related terminal, and thus, initiates a call to the specified terminal by using the multi-party voice call request.

Specifically, in an aspect, the signaling server returns the remote access address to the calling side according to a calling number identifier carried in the multi-party voice call request, so as to trigger the establishment of a data channel of the VoIP terminal on the calling side.

In another aspect, the signaling server initiates, to a corresponding terminal according to a called number identifier carried in the multi-party voice call request, the signaling exchange for establishing a call, so as to trigger a process of making responses between the signaling server and the terminal and establishing a data channel.

It should further be noted that for the process of making responses between the signaling server and the specified terminals and establishing the data channel, when the terminal is a telephone terminal, a gateway device may be used for implementation.

Step S550: Return the remote access address to a gateway device corresponding to specified terminals and/or the telephone terminal by using the signaling exchange, so as to establish a multi-party voice call.

In an aspect, the signaling server sends the remote access address to the VoIP terminal on the calling side, and in another aspect, the specified terminals include a VoIP terminal and/or the telephone terminal, so as to send the remote access address to the gateway device corresponding to the VoIP terminal and/or the telephone terminal, to trigger a process of establishing a multi-party voice call of a VoIP terminal and/or the telephone terminal on a called side.

The foregoing signaling server is used to implement the establishment of a multi-party voice call among the terminals. Based on the signaling server, the multi-party voice call is established for a VoIP terminal and a telephone terminal, and a call among the terminals is further implemented. For this call, a telephone terminal can be added to a multi-party voice call initiated by a VoIP terminal, so that a feasible signaling server is provided for a telephone terminal to perform a multi-party voice call. Therefore, by means of a signaling server, a VoIP terminal and a telephone terminal may have desirable interconnectivity, and a call can be freely made between the VoIP terminal and the telephone terminal.

In an exemplary embodiment, the signaling server initiates, to the terminals on the called side, signaling exchange for establishing a multi-party voice call, and further recognizes corresponding types of specified terminals in the currently initiated multi-party voice call request, so as to obtain a corresponding terminal recognition result.

The terminal recognition result indicates whether a terminal corresponding to the called side is a VoIP terminal or a telephone terminal. Therefore, the signaling exchange is initiated according to the terminal recognition result.

For example, when the terminal recognition result indicates that the terminal corresponding to the called side is a VoIP terminal, a multi-party voice call request may be directly forwarded, and when the terminal recognition result indicates that the terminal corresponding to the called side is a telephone terminal, a multi-party voice call request needs to be converted into a telephone call request and the telephone call request is then sent.

In an exemplary embodiment, a terminal is recognized according to a called identifier number. Specifically, it is determined whether the called identifier number is a registered identifier number, and if yes, a terminal recognition result that the terminal is a VoIP terminal is obtained, or if not, a terminal recognition result that a terminal is a telephone terminal is obtained.

That is, for any VoIP terminal, after the VoIP terminal performs a login, an identifier number corresponding to the VoIP terminal has been registered in the signaling server, so as to maintain an online state of the VoIP terminal in the signaling server, so that a call can be performed at any time.

Figure 8:
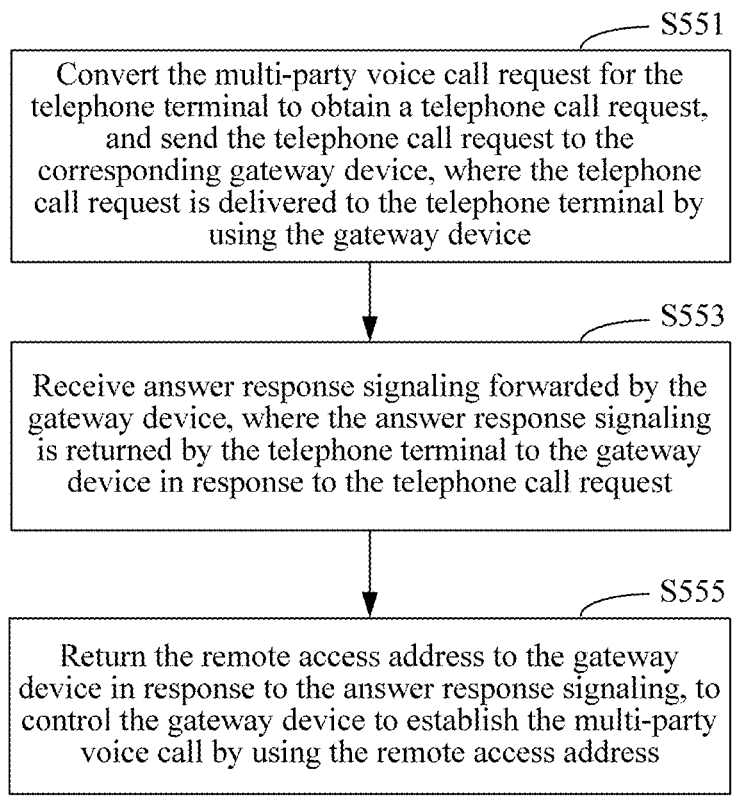
FIG. 8 is a flowchart of a method of returning a remote access address to a gateway device corresponding to specified terminals and/or a telephone terminal by using signaling exchange, so as to establish a multi-party voice call in FIG. 7 according to an exemplary embodiment.

Furthermore, in an exemplary embodiment, as shown in FIG. 8, step S550 includes steps S551 to S555.

Step S551: Convert the multi-party voice call request for the telephone terminal to obtain a telephone call request, and send the telephone call request to the corresponding gateway device, where the telephone call request is delivered to the telephone terminal by using the gateway device.

The terminals specified in the multi-party voice call request include a telephone terminal. Because protocol and data implementations involved in the Internet and the telephone terminal are different, the multi-party voice call request needs to be converted into a telephone call request recognizable to the gateway device and the telephone terminal.

After forwarding the multi-party voice call request to the telephone terminal to obtain the telephone call request, the signaling server sends the obtained telephone call request to the gateway device, so that the telephone call request can be delivered to the telephone terminal by using the gateway device.

Step S553: Receive answer response signaling forwarded by the gateway device, where the answer response signaling is returned by the telephone terminal to the gateway device in response to the telephone call request.

After receiving the telephone call request sent by the signaling server, the gateway device uses the telephone call request to enable the telephone terminal to send ringing notification, to wait for the telephone terminal to make a response.

In the telephone terminal that sends ringing notification, when an answer operation is detected, answer response signaling is correspondingly generated and sent to the gateway device, and the gateway device is used in place to report a response of the telephone terminal to the signaling server.

Step S555: Return the remote access address to the gateway device in response to the answer response signaling, to control the gateway device to establish the multi-party voice call by using the remote access address.

When acquiring the answer operation triggered in the telephone terminal, the signaling server establishes the multi-party voice call by returning the remote access address to the gateway device.

Specifically, the signaling server sends the remote access address, and the network device establishes the data channel for the telephone terminal, so as to complete the establishment of the multi-party voice call on the side of the telephone terminal.

In case of a VoIP terminal, a data channel is directly established with a server corresponding to the remote access address. On the other hand, in case of a telephone terminal, a data channel is established between a gateway device and the server corresponding to the remote access address.

In case of a telephone terminal, signaling exchange among a signaling server, a gateway device, and the telephone terminal is used to implement the establishment of a data channel between the signaling server and the gateway device, so as to further introduce the telephone terminal in a multi-party voice call. The signaling server successfully implements the introduction of a telephone terminal, thereby greatly enhancing call performance.

Figure 9:
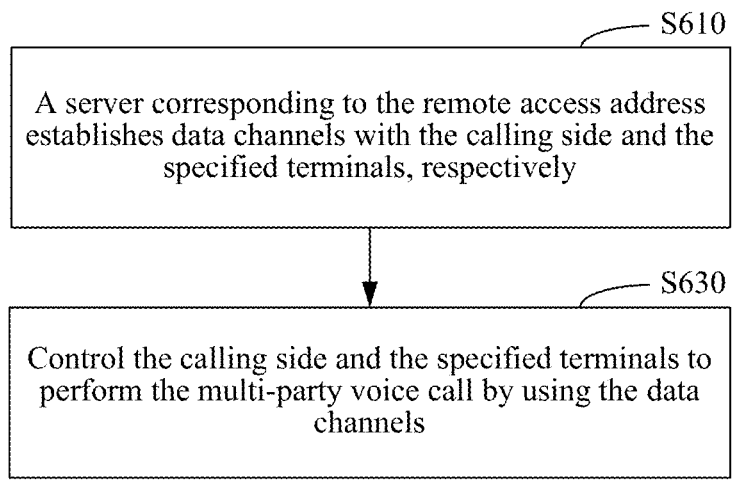
FIG. 9 is a flowchart of a real-time call method performed by a server corresponding to a remote access address in another exemplary embodiment.

In an exemplary embodiment, as shown in FIG. 9, the method further includes steps S610 and S630.

Step S610: A server corresponding to the remote access address establishes data channels with the calling side and the specified terminals, respectively.

After the signaling server sends the remote access address to trigger the establishment of the data channels in the terminals, the data channels are respectively established with the terminals in data corresponding to the remote access address. It should be noted that the terminals include a VoIP terminal on a calling side, and further include a VoIP terminal and/or a telephone terminal on a called side.

Step S630: Control the calling side and the specified terminals to perform the multi-party voice call by using the data channels.

By using the data channel established for each terminal, the server corresponding to the remote access address receives a data stream. The data stream is from any terminal in the multi-party voice call. In this case, related processing is performed on a data stream to enable each terminal in the multi-party voice call to obtain a data stream from another terminal by using a data channel of the terminal, and accordingly a multi-party voice call among the terminals can be performed.

The server corresponding to the remote access address may be a data server, and is configured to perform a data implementation such as transmission control in the multi-party voice call. The server and the signaling server may be carried on a same server device or may be separately carried on different server devices. The topology of servers is configured according to an actual operation requirement.

Figure 10:
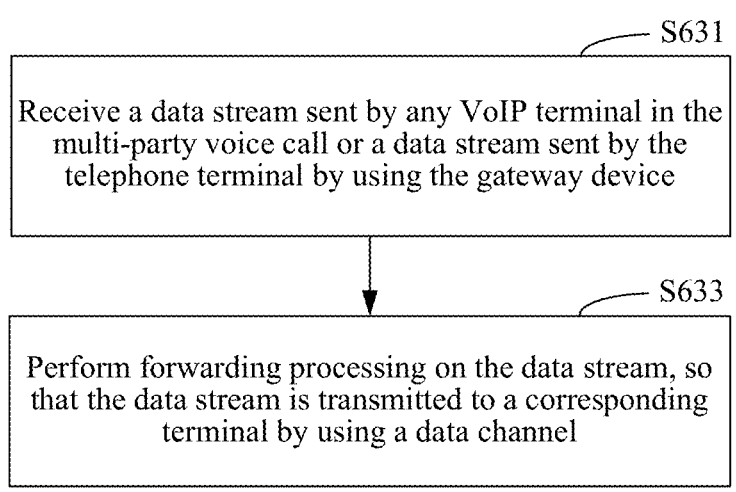
FIG. 10 is a flowchart of a method of controlling a calling side and a specified terminal to perform a multi-party voice call by using a data channel in FIG. 9 according to an exemplary embodiment.

Furthermore, as shown in FIG. 10, step S630 includes steps S631 and S633.

Step S631: Receive a data stream sent by any VoIP terminal in the multi-party voice call or a data stream sent by the telephone terminal by using the gateway device.

Based on the data channel, a data stream from any VoIP terminal or the telephone terminal is transmitted to the server corresponding to the remote access address.

Step S633: Perform forwarding processing on the data stream, so that the data stream is transmitted to a corresponding terminal by using a data channel.

In the server corresponding to the remote access address, for a multi-party voice call, one or more data streams are received, and therefore, forwarding processing may be performed. The forwarding processing may be direct forwarding or may be two operations, that is, audio mixing and forwarding.

For example, for one data stream, the data stream is directly forwarded. For multiple data streams, audio mixing may be performed before the data streams are forwarded.

Figure 11:
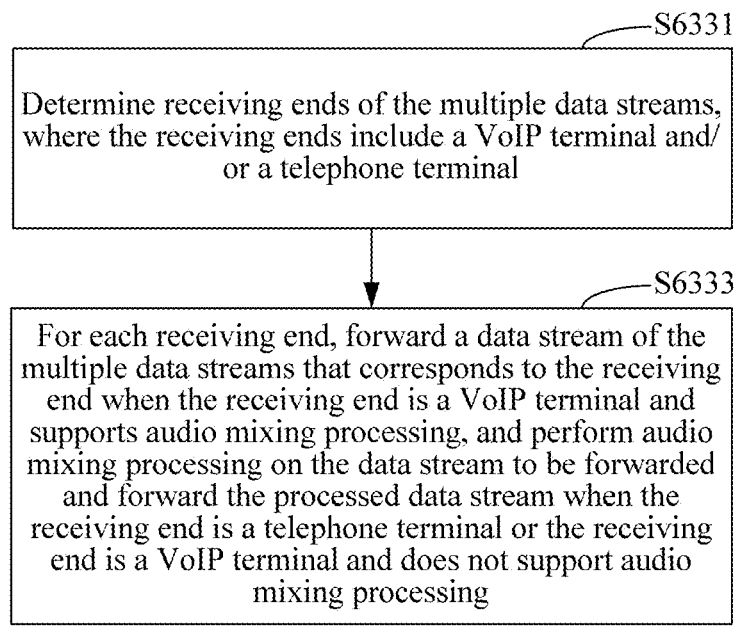
FIG. 11 is a flowchart of a method of performing forwarding processing on a data stream, so that the data stream is transmitted to a corresponding terminal by using a data channel in FIG. 10 according to an exemplary embodiment.

In an exemplary embodiment, multiple data streams are received, as shown in FIG. 11, step S633 includes steps S6331 and S6333.

Step S6331: Determine receiving ends of the multiple data streams, where the receiving ends include a VoIP terminal and/or a telephone terminal.

In the server corresponding to the remote access address, for a multi-party voice call, the server currently receives multiple data streams. In this case, processing is separately performed according to multiple receiving ends corresponding to the multiple data streams.

Specifically, according to identification information carried in the multiple data streams, a terminal other than the terminal corresponding to the identification information is a receiving end.

Step S6333: For each receiving end, forward a data stream of the multiple data streams that corresponds to the receiving end when the receiving end is a VoIP terminal and supports audio mixing processing, and perform audio mixing processing on the data stream to be forwarded and forward the processed data stream when the receiving end is a telephone terminal or the receiving end is a VoIP terminal and does not support audio mixing processing.

The forwarded data stream is any one data stream or any combination of data streams.

Among the received multiple data streams, each data stream has a corresponding receiving end. Therefore, among the determined multiple receiving ends, each receiving end has one corresponding data stream or a corresponding combination of data streams. Therefore, the data stream corresponding to each receiving end may be separately processed.

Specifically, when a VoIP terminal or gateway completes the establishment of a data channel to enter a multi-party voice call, the VoIP terminal or gateway further notifies the server corresponding to the remote access address of whether the VoIP terminal or gateway supports audio mixing processing. Based on this, in response to a receiving end being a VoIP terminal and being capable of supporting audio mixing processing, a corresponding data stream is directly forwarded. In response to the receiving end being a telephone terminal or the receiving end being a VoIP terminal and being incapable of supporting audio mixing processing, audio mixing processing may be performed on data streams, so that multiple data streams can be transmitted to the telephone terminal and the VoIP terminal that does not support audio mixing processing, so as to further ensure that a telephone terminal that can receive only one data stream can perform the multi-party voice call, and further provide compatibility with various types of VoIP terminals, thereby improving the application range of multi-party voice calls.

In an exemplary embodiment, audio mixing processing performed on the telephone terminal further includes encoding in a telephone format, the forwarded data stream is a code stream supported by the telephone terminal, and the method further includes:

receiving, by the gateway device, the code stream supported by the telephone terminal, and delivering the code stream to the corresponding telephone terminal.

The server corresponding to the remote access address performs audio mixing on a data stream that is to be transmitted to the telephone terminal, and further encodes the data stream, so that the data stream that is eventually forwarded to the gateway device and is further forwarded by the gateway device to the corresponding telephone terminal are recognizable to a network device and the telephone terminal, so as to further comply with the protocol and data implementations in a telephone network.

In an exemplary embodiment, in step S6333, the process of performing audio mixing processing on the data stream to be forwarded and forwarding the processed data stream when the receiving end is a telephone terminal or the receiving end is a VoIP terminal and does not support audio mixing processing may include:

superimposing the data streams to be forwarded to output one data stream, and adding identification information of the receiving end to the one output data stream when the receiving end is a telephone terminal or the receiving end is a VoIP terminal and does not support audio mixing processing; and forwarding the one data stream that carries the identification information of the receiving end to the receiving end.

In this process, the superimposition of data streams may be implemented by using linear superimposition of multiple digital signals in a time domain. One data stream that is obtained after superimposition carries identification information of a receiving end, so that the receiving end can easily and rapidly determine whether server audio mixing has been performed by using this identification information.

By using the foregoing process, the system architecture and implementation of a server and a gateway device are provided for the implementation of a multi-party voice call, so that a multi-party voice call among multiple terminals including a VoIP terminal and a telephone terminal can be implemented.

Figure 12:
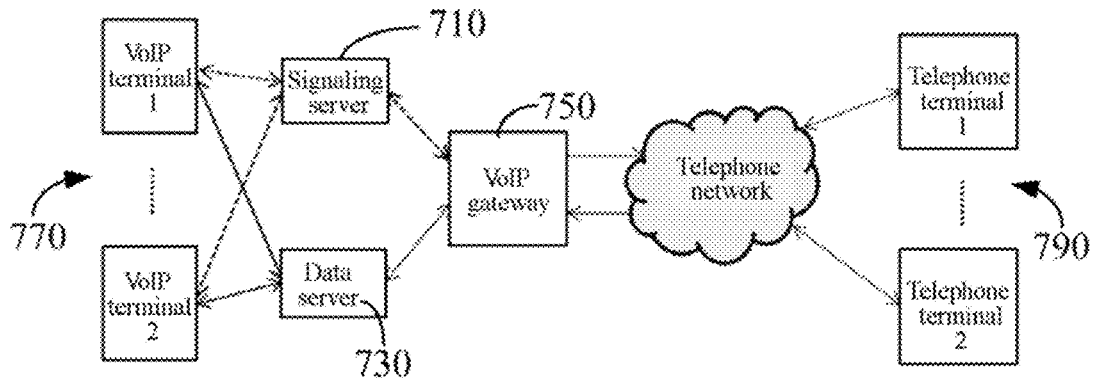
FIG. 12 is a topology diagram of implementing a multi-party voice call in an exemplary embodiment.

The foregoing multi-party voice call is described below in detail with reference to an exemplary embodiment. In an exemplary embodiment, the multi-party voice call includes n terminals. As shown in FIG. 12, n is an integer not less than 4. Such a multi-party voice call is used as an example for description.

The n terminals at least include a VoIP terminal 1, a VoIP terminal 2, a telephone terminal 1, and a telephone terminal 2. The multi-party voice call includes a call process of the multi-party voice call and a data processing process after the multi-party voice call is established.

Figure 13:
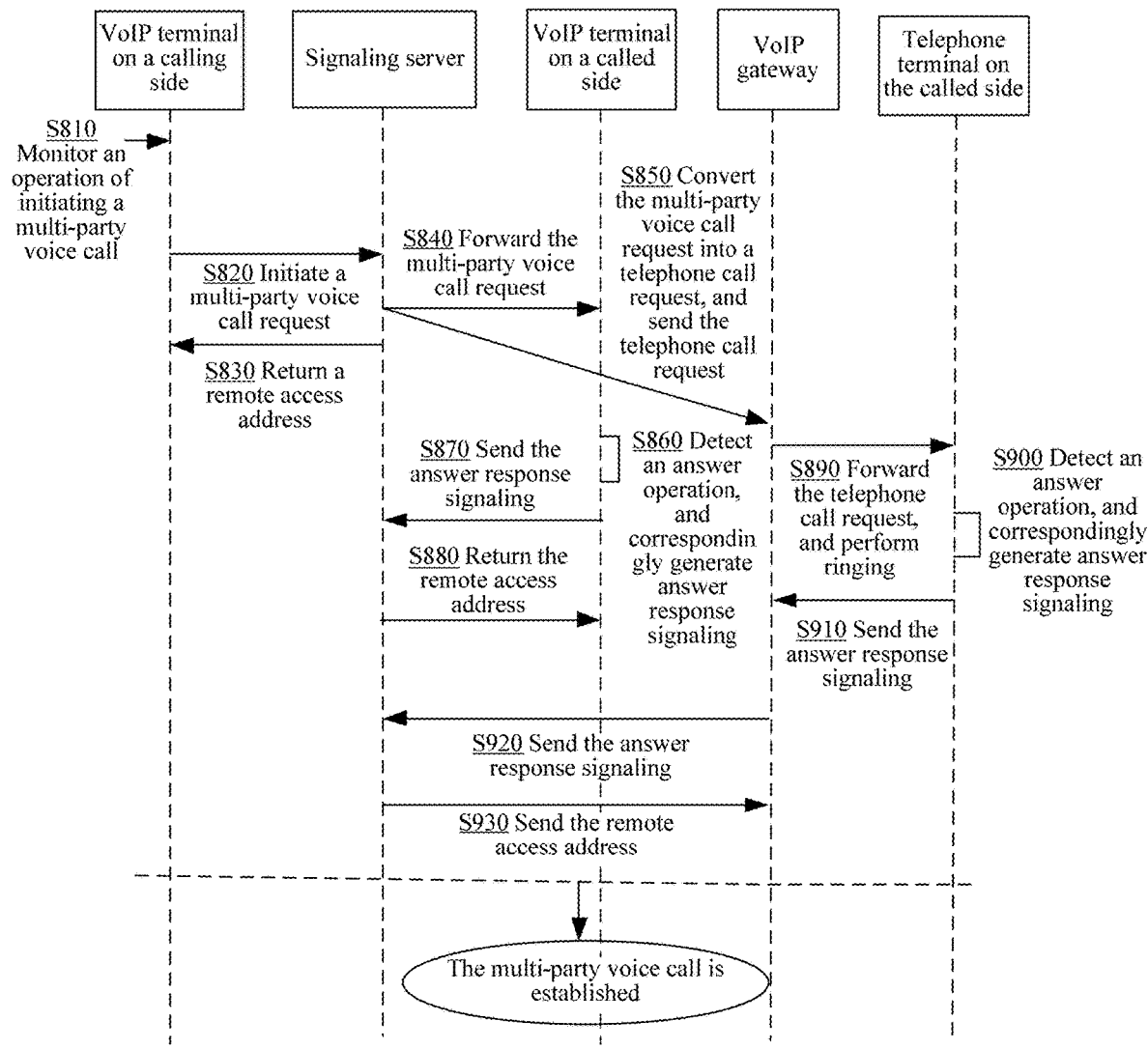
FIG. 13 is a timing diagram of a call process of the multi-party voice call in FIG. 12 according to an exemplary embodiment.

A VoIP terminal 770 serves as a party on a calling side to initiate a multi-party voice call request to a signaling server 710. Another VoIP terminal 770 and a telephone terminal 790 serve as parties on a called side, and respond to the multi-party voice call request under the control of the signaling server 710. That is, a timing process shown in FIG. 13 is executed. Further, each terminal can obtain a remote access address from the signaling server 710, and further establish a data channel of the terminal, thereby completing the call process of the multi-party voice call.

The remote access address is an address of a data server 730.

Any VoIP terminal 770 encodes input call data to obtain a data stream input by the VoIP terminal 770 and forwards the data stream to the data server 730 by using the data channel.

Voice data input in any telephone terminal 790 is sent to a VoIP gateway 750. The VoIP gateway 750 forwards the voice data to the data server 730. The data server 730 immediately forwards the voice data to obtain a data stream that can be parsed by the VoIP terminal 770.

Based on this, in one reception of the data server 730, multiple data streams are received. The data server 730 determines terminals to which the multiple data streams are to be sent, that is, the data server 730 determines receiving ends; and directly forwards the data streams to each receiving end or performs forwarding after audio mixing processing.

The data server 30 performs audio mixing processing and performs forwarding of a data stream in response to the receiving end being a telephone terminal 790. The audio mixing processing further includes a process of encoding according to a format required by a telephone, so as to obtain a data stream recognizable by the telephone terminal 790.

By using the foregoing process, a multi-party voice call of the telephone terminal 790 is implemented and adaptive and dynamic switching of audio mixing is supported in the multi-party voice call, thereby greatly enhancing call performance.

The foregoing VoIP terminal 770 may be various mobile terminals and fixed-line terminals, for example, a smartphone, a tablet phone, and a desktop computer. Any terminal that can access the Internet and run a VoIP application can be used as the VoIP terminal 770.

Figure 14:
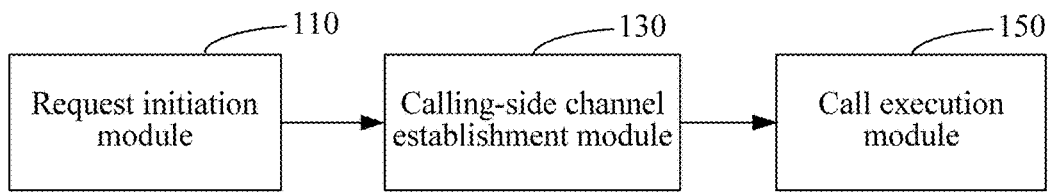
FIG. 14 is a schematic structural diagram of a real-time call apparatus running on a VoIP terminal on a calling side in an exemplary embodiment.

In an exemplary embodiment, a real-time call apparatus is further correspondingly provided. The apparatus runs on a calling side, and the calling side is a VoIP terminal. As shown in FIG. 14, the apparatus includes a request initiation module 110, a calling-side channel establishment module 130, and a call execution module 150.

The request initiation module 110 is configured to initiate a multi-party voice call request to a signaling server, where terminals that are specified in the multi-party voice call request and join a multi-party voice call include a telephone terminal.

The calling-side channel establishment module 130 is configured to establish a data channel according to a remote access address returned by the signaling server in response to the multi-party voice call request.

The call execution module 150 is configured to perform the multi-party voice call after the specified terminals establish data channels according to the remote access address.

During establishment of the data channels of the terminals, the telephone terminal establishes a data channel corresponding to the remote access address by using a gateway device.

Figure 15:
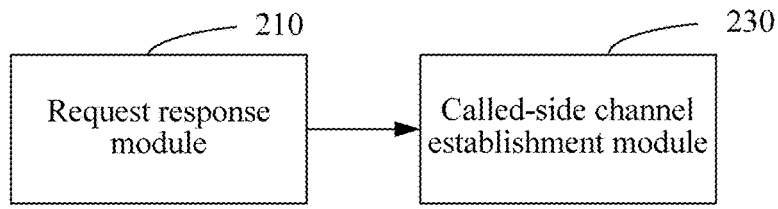
FIG. 15 is a schematic structural diagram of a real-time call apparatus running on a VoIP terminal on a called side in an exemplary embodiment.

In an exemplary embodiment, as shown in FIG. 15, the foregoing apparatus further includes a request response module 210 and a called-side channel establishment module 230. The request response module 210 and the called-side channel establishment module 230 run on each specified VoIP terminal that joins the multi-party voice call.

The request response module 210 is configured to respond to the multi-party voice call request forwarded by the signaling server, to obtain the remote access address.

The called-side channel establishment module 230 is configured to establish a data channel of the network terminal according to the remote access address.

In another exemplary embodiment, the foregoing apparatus further includes: a call receiving module running on a VoIP terminal in the multi-party voice call, where the call receiving module is configured to: receive a data stream transmitted on a data channel, perform adaptive audio mixing processing on the data stream, and play the processed data stream.

Figure 16:
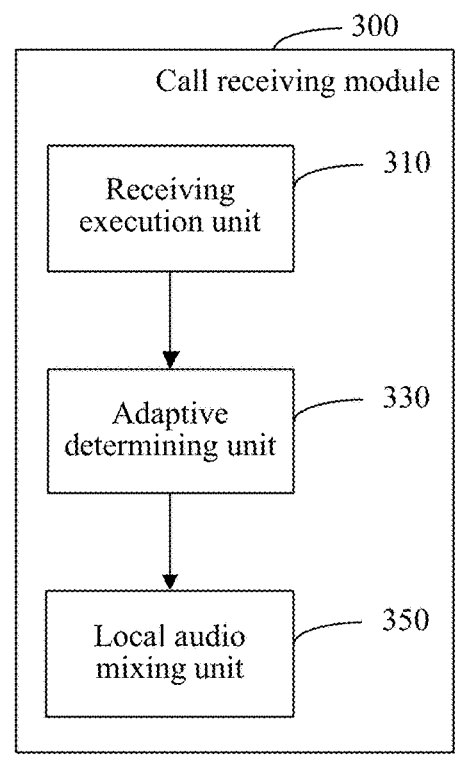
FIG. 16 is a schematic structural diagram of a call receiving module in an exemplary embodiment.

Furthermore, in an exemplary embodiment, as shown in FIG. 16, the call receiving module 300 includes a receiving execution unit 310, an adaptive determining unit 330, and a local audio mixing unit 350.

The receiving execution unit 310 is configured to receive a data stream by using the data channel, where the data stream is from another terminal.

The adaptive determining unit 330 is configured to: perform adaptive determining on the data stream, and output an adaptive determining result that audio mixing has not been performed on the data stream.

The local audio mixing unit 350 is configured to: perform audio mixing processing on the data stream according to the adaptive determining result, and play a data stream obtained after audio mixing processing.

Furthermore, the adaptive determining unit 330 is configured to: determine whether the data stream carries identification information of the VoIP terminal, and if not, output an adaptive determining result that audio mixing has not been performed on the data stream, or if yes, output an adaptive determining result that audio mixing has been performed on the data stream, where the adaptive determining result triggers playing of the data stream.

In an exemplary embodiment, the foregoing apparatus further includes a data stream input module. The data stream input module runs on any VoIP terminal in the multi-party voice call, and is configured to: encode input call data to obtain a data stream input by the VoIP terminal, and transmit the data stream by using the established data channel.

Figure 17:
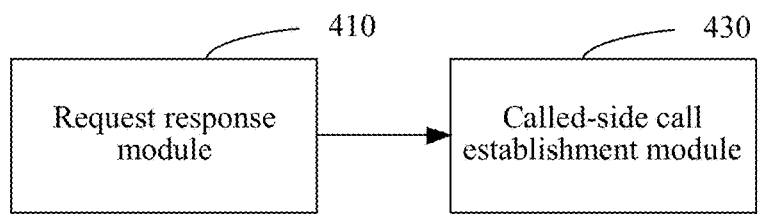
FIG. 17 is a schematic structural diagram of a real-time call apparatus running on a VoIP terminal on a called side in an exemplary embodiment.

In an exemplary embodiment, a real-time call apparatus is further correspondingly provided. The apparatus runs on a VoIP terminal on a called side. As shown in FIG. 17, the apparatus includes a request response module 410 and a called-side call establishment module 430.

The request response module 410 is configured to respond to a multi-party voice call request forwarded by a signaling server, to obtain a remote access address, where terminals that are specified in the multi-party voice call request and join a multi-party voice call include a telephone terminal.

The called-side call establishment module 430 is configured to establish a data channel of the VoIP terminal according to the remote access address.

The terminals specified in the multi-party voice call request enter the multi-party voice call after establishing data channels according to the remote access address.

Figure 18:
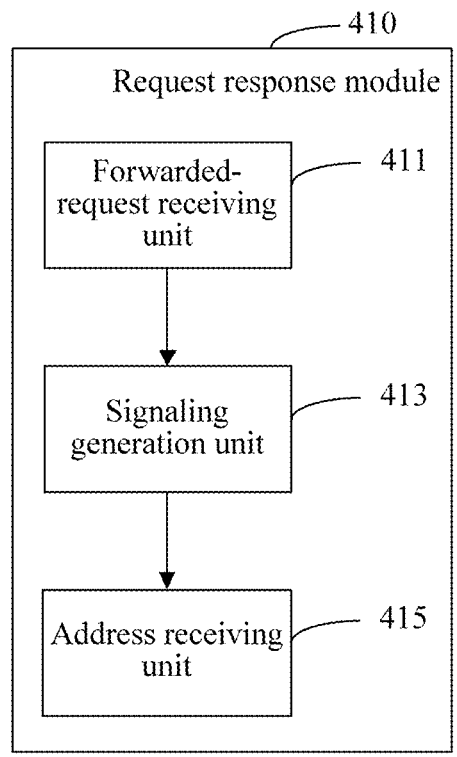
FIG. 18 is a schematic structural diagram of a request response module in FIG. 17 according to an exemplary embodiment.

Furthermore, as shown in FIG. 18, the request response module 410 includes a forwarded-request receiving unit 411, a signaling generation unit 413, and an address receiving unit 415.

The forwarded-request receiving unit 411 is configured to receive the multi-party voice call request forwarded by the signaling server for a calling side.

The signaling generation unit 413 is configured to: generate answer response signaling according to a detected answer operation, and transfer the answer response signaling to the signaling server.

The address receiving unit 415 is configured to receive the remote access address sent by the signaling server according to the answer response signaling.

Figure 19:
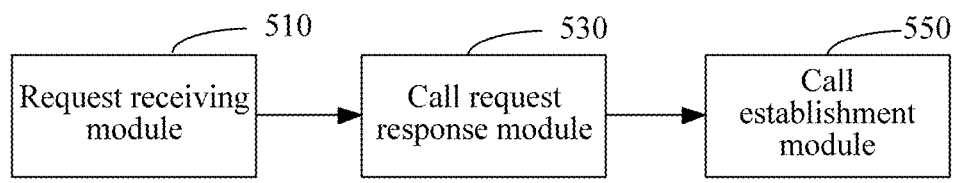
FIG. 19 is a schematic structural diagram of a signaling server in a real-time call system in an exemplary embodiment.

In an exemplary embodiment, a real-time call system is further correspondingly provided. As shown in FIG. 19, the system includes a request receiving module 510, a call request response module 530, and a call establishment module 550 that run on a signaling server.

The request receiving module 510 is configured to receive a multi-party voice call request initiated by a calling side.

The call request response module 530 is configured to: return a remote access address to the calling side in response to the multi-party voice call request, and initiate, to terminals specified in the multi-party voice call request, signaling exchange for establishing a call, where the specified terminals include a telephone terminal.

The call establishment module 550 is configured to return the remote access address to a gateway device corresponding to a VoIP terminal and/or the telephone terminal included in the specified terminals by using the signaling exchange, so as to establish a multi-party voice call.

Figure 20:
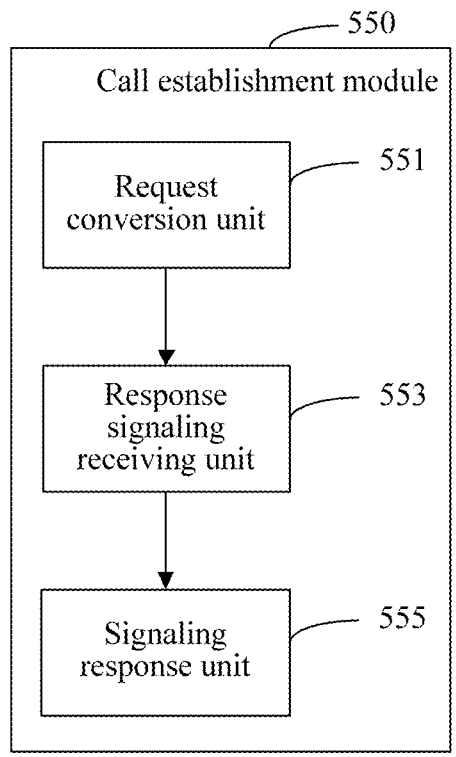
FIG. 20 is a schematic structural diagram of a call establishment module in FIG. 19 according to an exemplary embodiment.

Furthermore, in an exemplary embodiment, as shown in FIG. 20, the call establishment module 550 includes a request conversion unit 551, a response signaling receiving unit 553, and a signaling response unit 555.

The request conversion unit 551 is configured to: convert the multi-party voice call request for the telephone terminal to obtain a telephone call request, and send the telephone call request to the corresponding gateway device, where the telephone call request is delivered to the telephone terminal by using the gateway device.

The response signaling receiving unit 553 is configured to receive answer response signaling forwarded by the gateway device, where the answer response signaling is returned by the telephone terminal to the gateway device in response to the telephone call request.

The signaling response unit 555 is configured to return the remote access address to the gateway device in response to the answer response signaling, to control the gateway device to establish the multi-party voice call by using the remote access address.

Figure 21:
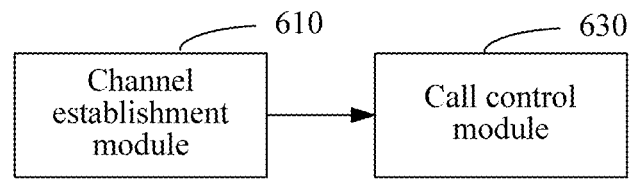
FIG. 21 is a schematic structural diagram of a server corresponding to a remote access address in an exemplary embodiment.

In an exemplary embodiment, as shown in FIG. 21, the system further includes a channel establishment module 610 and a call control module 630. The channel establishment module 610 and the call control module 630 run on a server corresponding to the remote access address.

The channel establishment module 610 is configured to establish data channels with the calling side and the specified terminals, respectively.

The call control module 630 is configured to control the calling side and the specified terminals to perform the multi-party voice call by using the data channels.

Figure 22:
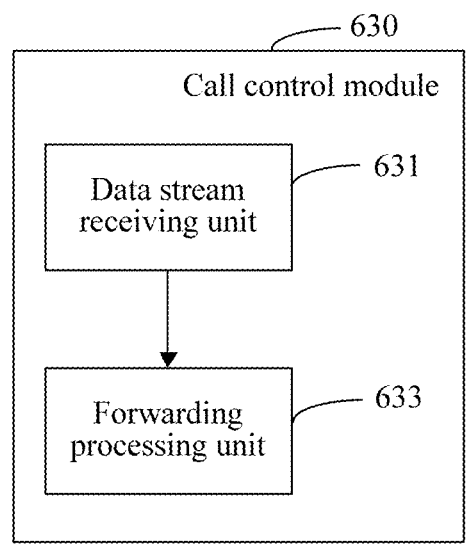
FIG. 22 is a schematic structural diagram of a call control module in FIG. 21 according to an exemplary embodiment.

Furthermore, in an exemplary embodiment, as shown in FIG. 22, the call control module 630 includes a data stream receiving unit 631, and a forwarding processing unit 633.

The data stream receiving unit 631 is configured to receive a data stream sent by any VoIP terminal in the multi-party voice call or a data stream sent by the telephone terminal by using the gateway device.

The forwarding processing unit 633 is configured to perform forwarding processing on the data stream, so that the data stream is transmitted to a corresponding terminal by using a data channel.

Figure 23:
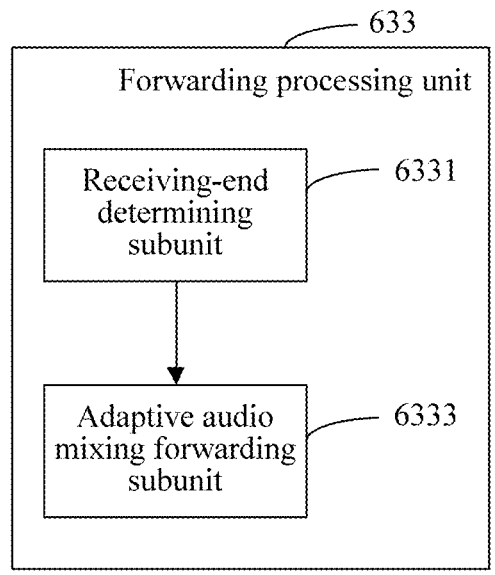
FIG. 23 is a schematic structural diagram of a forwarding processing unit in FIG. 22 according to an exemplary embodiment.

Furthermore, multiple data streams are received, and as shown in FIG. 23, the forwarding processing unit 633 includes a receiving-end determining subunit 6331 and an adaptive audio mixing forwarding subunit 6333.

The receiving-end determining subunit 6331 is configured to determine receiving ends of the multiple data streams, where the receiving ends include a VoIP terminal and/or a telephone terminal.

The adaptive audio mixing forwarding subunit 6333 is configured to: forward a data stream of the multiple data streams that corresponds to the receiving end when the receiving end is a VoIP terminal and supports audio mixing processing, and perform audio mixing processing on the data stream to be forwarded and forward the processed data stream when the receiving end is a telephone terminal or the receiving end is a VoIP terminal and does not support audio mixing processing.

The forwarded data stream is any one data stream or any combination of data streams.

Furthermore, audio mixing processing performed on the telephone terminal includes encoding in a telephone format, the forwarded data stream is a code stream supported by the telephone terminal, and the system further includes the gateway device. The gateway device is configured to: receive the code stream supported by the telephone terminal, and deliver the code stream to the corresponding telephone terminal.

Figure 24:
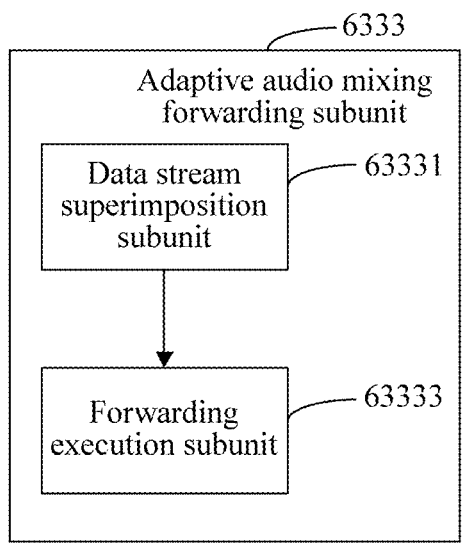
FIG. 24 is a schematic structural diagram of an adaptive audio mixing forwarding subunit in FIG. 23 according to an exemplary embodiment.

In an exemplary embodiment, as shown in FIG. 24, the adaptive audio mixing forwarding subunit 6333 includes a data stream superimposition subunit 63331 and a forwarding execution subunit 63333.

The data stream superimposition subunit 63331 is configured to: superimpose the data streams to be forwarded to output one data stream, and add identification information of the receiving end to the one output data stream when the receiving end is a telephone terminal or the receiving end is a VoIP terminal and does not support audio mixing processing.

The forwarding execution subunit 63333 is configured to forward the one data stream that carries the identification information of the receiving end to the receiving end.

In an exemplary embodiment, a real-time call system is further correspondingly provided. Referring to FIG. 12, the system includes terminals that join a multi-party voice call, the signaling server 710, the data server 730, and the gateway device 750. The terminals include VoIP terminals 770 and the telephone terminal 790.

Any one of the VoIP terminals may 770 initiate a multi-party voice call request to the signaling server 710.

A remote access address of the data server 730 is returned to the VoIP terminal 770 that initiates the multi-party voice call request, signaling exchange for establishing a call is initiated to another terminal in the multi-party voice call, and the remote access address is returned to the gateway device 750 corresponding to another VoIP terminal 770 and/or the telephone terminal 790 by using the signaling exchange.

The gateway device 750 corresponding to the VoIP terminals 770 and/or the telephone terminal 90 establishes data channels with the data server 730 by using the remote access address, so as to perform the multi-party voice call.

A real-time call method provided in an exemplary embodiment is implemented by using the computer program. The real-time call apparatus and system are stored in a computer system 900 shown in FIG. 25, so as to run in the computer system 900.

Figure 25:
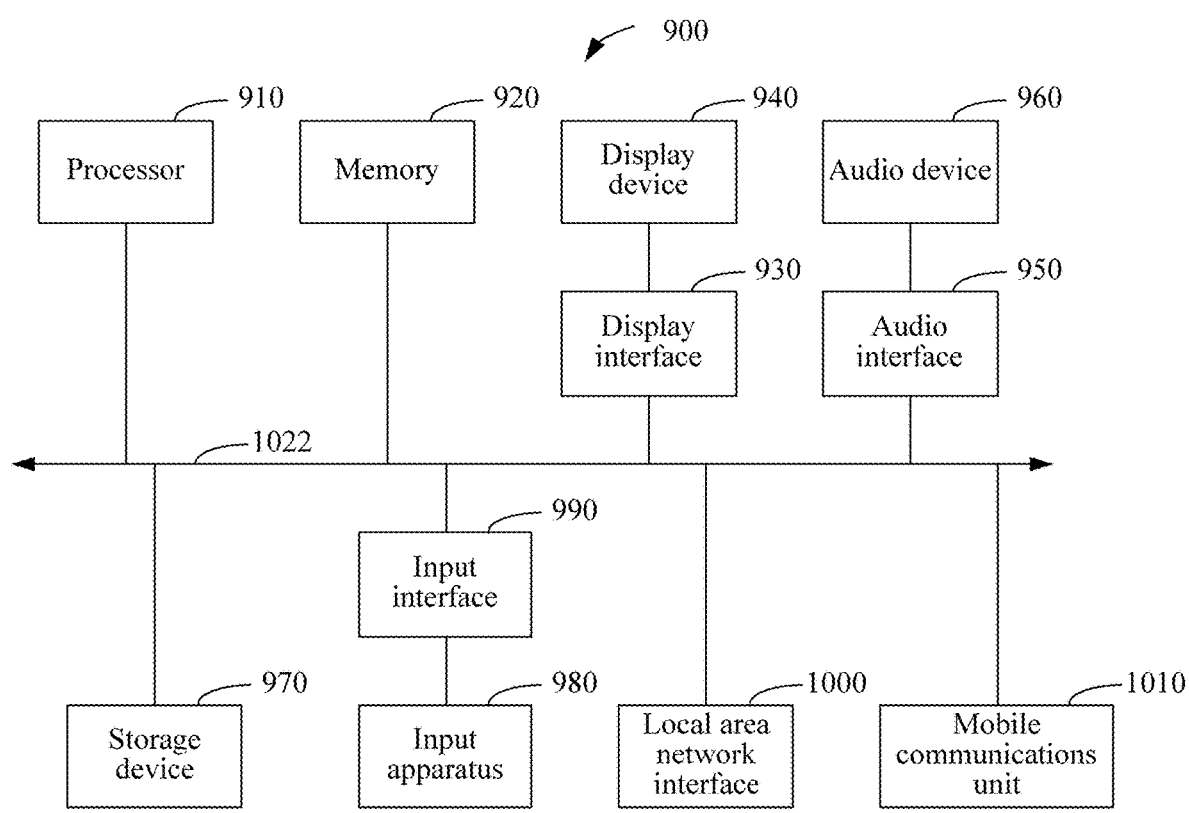
FIG. 25 is a schematic structural diagram of a computer system implementing a real-time call method in an exemplary embodiment.

As shown in FIG. 25, the computer system 900 includes a processor 910, a memory 920, and a system bus 922. Various system components including the memory 920 and the processor 910 are connected to the system bus 1022. The processor 910 is hardware for executing computer program instructions by means of basic arithmetic and logic operations in the computer system. The memory 920 is a physical device for temporarily or permanently storing computer programs or data (for example, program state information), and stores program instructions and other data of a processing method of a system telephone in a voice call. The processor 910 executes the program instructions in the memory 920, monitors a state change of the system telephone, and responds to the state change, so as to implement temporary interruption or restoration of a voice call. The processor 910 and the memory 920 can perform data communication through the system bus 1022. The memory 920 includes a read-only memory (ROM) or a flash memory (both not shown), and a random-access memory (RAM), where the RAM generally refers to a main memory loaded with an operating system and application programs.

The computer system 900 further includes a display interface 930 (for example, a graphics processing unit), a display device 940 (for example, a liquid crystal display), an audio interface 950 (for example, a sound card) and an audio device 960 (for example, a loudspeaker). The display device 940 is used to display a voice call interface.

The computer system 900 generally includes one storage device 970. The storage device 970 may be selected from multiple types of computer readable media. The computer readable media refer to any available media that can be accessed by the computer system 900, and include removable media and non-removable media. For example, the computer readable media include, but not limited to, a flash memory (micro SD card), a CD-ROM, a digital versatile disc (DVD) or other optical storage, a cassette, a magnetic tape, a disk storage or other magnetic storage devices, or any other media that can be used to store required information and can be accessed by the computer system 900.

The computer system 900 further includes an input device 980 and an input interface 990 (for example, an IO controller). A user may input an instruction and information into the computer system 900 by using the input device 980, such as a keyboard, a mouse or a touch panel device on the display device 940. The input device 980 is generally connected to the system bus 922 through the input interface 990, but may also be connected through other interfaces or bus structures, such as a universal serial bus (USB).

The computer system 900 may be logically connected to one or more network devices in a network environment. The network device may be a personal computer, a server, a router, a smartphone, a tablet computer or other public network nodes. The computer system 900 is connected to the network device through a local area network (LAN) interface 1000 or a mobile communications unit 1010. A local area network (LAN) refers to an interconnected computer network in a limited area such as a family, a school, a computer laboratory, or an office building using network media. WiFi and Ethernet over twisted pair are the most commonly used two technologies for building a local area network. WiFi is a technology that enables the computer system 900 to exchange data or to be connected to a wireless network through radio waves. The mobile communications unit 1010 is capable of making and receiving calls through radio communications lines while moving in a broad geographic area. In addition to calling, the mobile communications unit 1010 also supports the Internet access in a 2G, 3G or 4G cellular communications system that provides mobile data services.

As described above in detail, the computer system 900 applicable to the disclosure can execute specified operations in the foregoing real-time call. The computer system 900 executes these operations in the form of running program instructions in the computer readable media by the processor 910. These program instructions may be read into the memory 920 from the storage device 970 or from another device through the local area network interface 1000. The program instructions stored in the memory 920 enable the processor 910 to perform the foregoing method for implementing image processing. Moreover, the disclosure may also be implemented by using a hardware circuit or by using a combination of a hardware circuit and software instructions. Therefore, the implementation of the disclosure is not limited to any particular combination of a hardware circuit and software.

The computer system 900 is merely an example of computer system environments applicable to the disclosure, and should not be construed as any limitation on the application scope of the disclosure. The computer system 900 also should not be interpreted as needing to rely on or have one or a combination of parts of the exemplary computer system 900 shown in FIG. 7.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

At least one of the components, elements, modules or units described herein may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

Although the disclosure has been described with reference to several typical implementation manners, it should be understood that the terms used are illustrative and exemplary but are not limitative. The disclosure can be specifically implemented in many forms without departing from the spirit and essence of the disclosure, and therefore it should be understood that the foregoing implementation manners are not limited to any details above but instead should be widely explained in the spirit and scope defined by the appended claims. Therefore, all changes and variations falling within the claims and equivalent scope thereof should all be covered by the appended claims.

What is claimed is:

1. A real-time call method performed by a calling side, the calling side being a Voice over Internet Protocol (VoIP) terminal, the method comprising:

initiating a multi-party voice call request to a signaling server, wherein terminals that are specified in the multi-party voice call request comprise a telephone terminal;

establishing a data channel according to a remote access address returned by the signaling server in response to the multi-party voice call request, the remote access address being returned to a gateway device corresponding to the specified terminals including the telephone terminal; and performing a multi-party voice call based on establishment of data channels of the terminals according to the remote access address, wherein the telephone terminal establishes a data channel according to the remote access address.

2. The method according to claim 1, further comprising:
responding, by an VoIP terminal that is specified in the multi-party voice call request, to the multi-party voice call request forwarded by the signaling server, to obtain the remote access address; and
establishing a data channel of the specified VoIP terminal according to the remote access address.

3. The method according to claim 1, further comprising:
receiving, by VoIP terminals in the multi-party voice call, data streams transmitted on the data channels, performing adaptive audio mixing processing on the data streams, and playing the processed data streams.

4. The method according to claim 3,
wherein the receiving comprises, receiving, by each VoIP terminal in the multi-party voice call, a data stream by using the data channel, wherein the data stream is from another terminal,
wherein the performing the adaptive audio mixing processing comprises performing adaptive determining on the data stream, and outputting a first adaptive determining result that audio mixing has not been performed on the data stream, and
wherein the playing comprises performing audio mixing processing on the data stream according to the first adaptive determining result, and playing a data stream obtained in response to the audio mixing processing.

5. The method according to claim 4, further comprising:
outputting the first adaptive determining result that the audio mixing has not been performed on the data stream in response to determining that the data stream carries identification information of the VoIP terminal, and
outputting a second adaptive determining result that the audio mixing has been performed on the data stream in response to determining that the data stream does not carry the identification information of the VoIP terminal, wherein the second adaptive determining result triggers playing of the data stream.

6. The method according to claim 1, further comprising:
encoding, by any VoIP terminal in the multi-party voice call, input call data to obtain a data stream input by the VoIP terminal, and transmitting the data stream by using the established data channel.

7. A real-time call method performed by a Voice over Internet Protocol (VoIP) terminal on a called side, the method comprising:
responding to a multi-party voice call request forwarded by a signaling server, to obtain a remote access address, wherein terminals that are specified in the multi-party voice call request comprise a telephone terminal, the remote access address being returned to a gateway device corresponding to the specified terminals including the telephone terminal; and
establishing a data channel of the VoIP terminal according to the remote access address,
wherein the terminals specified in the multi-party voice call request enter a multi-party voice call based on establishment of data channels according to the remote access address.

8. The method according to claim 7, wherein the responding comprises:
receiving the multi-party voice call request forwarded by the signaling server;
generating answer response signaling according to a detected answer operation, and transferring the answer response signaling to the signaling server; and
receiving the remote access address sent by the signaling server according to the answer response signaling.

9. A real-time call method performed by a signaling server, the method comprising:
receiving a multi-party voice call request initiated by a calling side;
returning a remote access address to the calling side in response to the multi-party voice call request, and initiating, to terminals specified in the multi-party voice call request, signaling exchange for establishing a call, the specified terminals comprising a telephone terminal; and
returning the remote access address to a gateway device corresponding to a Voice over Internet Protocol (VoIP) terminal and/or the telephone terminal comprised in the specified terminals by using the signaling exchange, to establish a multi-party voice call.

10. The method according to claim 9, wherein the returning the remote access address comprises:
converting the multi-party voice call request for the telephone terminal to obtain a telephone call request, and sending the telephone call request to the corresponding gateway device, wherein the telephone call request is delivered to the telephone terminal by using the gateway device;
receiving answer response signaling forwarded by the gateway device, wherein the answer response signaling is returned by the telephone terminal to the gateway device in response to the telephone call request; and
returning the remote access address to the gateway device in response to the answer response signaling, to control the gateway device to establish the multi-party voice call by using the remote access address.

11. The method according to claim 9, further comprising:
establishing, by a server corresponding to the remote access address, data channels with the calling side and the specified terminals, respectively; and
controlling the calling side and the specified terminals to perform the multi-party voice call by using the data channels.

12. The method according to claim 11, wherein the controlling comprises:
receiving a data stream sent by any VoIP terminal in the multi-party voice call or a data stream sent by the telephone terminal by using the gateway device; and
performing forwarding processing on the data stream, so that the data stream is transmitted to a corresponding terminal by using a data channel.

13. The method according to claim 12, wherein multiple data streams are received, and the performing comprises:
determining receiving ends of the multiple data streams, wherein the receiving ends comprise the VoIP terminal and/or the telephone terminal; and
for each receiving end, forwarding a data stream of the multiple data streams that corresponds to the receiving end when the receiving end is the VoIP terminal and supports audio mixing processing, and performing the audio mixing processing on the data stream to be forwarded and forwarding the processed data stream when the receiving end is the telephone terminal or the receiving end is the VoIP terminal and does not support the audio mixing processing, wherein
the forwarded data stream is any one data stream or any combination of data streams.

14. The method according to claim 13, wherein the audio mixing processing performed on the telephone terminal comprises encoding in a telephone format, the forwarded data stream is a code stream supported by the telephone terminal, and the method further comprises:
receiving, by the gateway device, the code stream supported by the telephone terminal, and delivering the code stream to a corresponding telephone terminal.

15. The method according to claim 13, wherein the performing the audio mixing processing comprises:
superimposing the data streams to be forwarded to output one data stream, and adding identification information of the receiving end to the one output data stream when the receiving end is the telephone terminal or the receiving end is the VoIP terminal and does not support the audio mixing processing; and
forwarding the one data stream that carries the identification information of the receiving end to the receiving end.

16. A real-time call apparatus, the apparatus running on a calling side, the calling side being a Voice over Internet Protocol (VoIP) terminal, and the apparatus comprising at least one processor to implement:
a request initiation module, configured to initiate a multi-party voice call request to a signaling server, terminals that are specified in the multi-party voice call request comprising a telephone terminal;
a calling-side channel establishment module, configured to establish a data channel according to a remote access address returned by the signaling server in response to the multi-party voice call request, the remote access address being returned to a gateway device corresponding to the specified terminals including the telephone terminal; and
a call execution module, configured to perform the multi-party voice call based on the specified terminals establishing data channels according to the remote access address,
wherein the telephone terminal establishes a data channel corresponding to the remote access address.

17. The apparatus according to claim 16, wherein the at least one processor further implements a request response module and a called-side channel establishment module run on each specified VoIP terminal, wherein
the request response module is configured to respond to the multi-party voice call request forwarded by the signaling server, to obtain the remote access address; and
the called-side channel establishment module is configured to establish a data channel of a network terminal according to the remote access address.

18. The apparatus according to claim 16, wherein the at least one processor further implements a call receiving module running on a VoIP terminal in the multi-party voice call, wherein
the call receiving module is configured to: receive a data stream transmitted on a data channel, perform adaptive audio mixing processing on the data stream, and play the processed data stream.

19. The apparatus according to claim 18, wherein the call receiving module comprises:
a receiving execution unit, configured to receive a data stream by using the data channel, wherein the data stream is from another terminal;
an adaptive determining unit, configured to: perform adaptive determining on the data stream, and output an adaptive determining result that audio mixing has not been performed on the data stream; and
a local audio mixing unit, configured to: perform the audio mixing processing on the data stream according to the adaptive determining result, and play a data stream obtained in response to the audio mixing processing.

20. The apparatus according to claim 19, wherein the adaptive determining unit is further configured to: determine whether the data stream carries identification information of the VoIP terminal, output a first adaptive determining result that audio mixing has not been performed on the data stream in response to determining that the data stream carries identification information of the VoIP terminal, and output a second adaptive determining result that audio mixing has been performed on the data stream in response to determining that the data stream does not carry identification information of the VoIP terminal, wherein the second adaptive determining result triggers playing of the data stream.

21. The apparatus according to claim 16, wherein the at least one processor further implements:
a data stream input module, running on any VoIP terminal in the multi-party voice call, and configured to: encode input call data to obtain a data stream input by the VoIP terminal, and transmit the data stream by using the established data channel.

22. A real-time call apparatus, the apparatus running on a Voice over Internet Protocol (VoIP) terminal on a called side, and the apparatus comprising at least one processor to implement:
a request response module, configured to respond to a multi-party voice call request forwarded by a signaling server, to obtain a remote access address, wherein terminals that are specified in the multi-party voice call request comprise a telephone terminal, the remote access address being returned to a gateway device corresponding to the specified terminals including the telephone terminal; and
a called-side channel establishment module, configured to establish a data channel of the VoIP terminal according to the remote access address,
wherein the terminals specified in the multi-party voice call request enter the multi-party voice call based on establishment of data channels according to the remote access address.

23. The apparatus according to claim 22, wherein the request response module comprises:
a forwarded-request receiving unit, configured to receive the multi-party voice call request forwarded by the signaling server for a calling side;
a signaling generation unit, configured to: generate answer response signaling according to a detected answer operation, and transfer the answer response signaling to the signaling server; and
an address receiving unit, configured to receive the remote access address sent by the signaling server according to the answer response signaling.

24. A real-time call system, comprising an apparatus running on a Voice over Internet Protocol (VoIP) terminal, the apparatus comprising at least one processor to implement:
a request receiving module configured to receive a multi-party voice call request initiated by a calling side;
a call request response module configured to: return a remote access address to the calling side in response to the multi-party voice call request, and initiate, to terminals specified in the multi-party voice call request, signaling exchange for establishing a call, the specified terminals comprising a telephone terminal; and a call establishment module configured to return the remote access address to a gateway device corresponding to a Voice over Internet Protocol (VoIP) terminal and/or the telephone terminal comprised in the specified terminals by using the signaling exchange, to establish a multi-party voice call.

25. The system according to claim 24, wherein the call establishment module comprises at least one processor to implement:

a request conversion unit, configured to: convert the multi-party voice call request for the telephone terminal to obtain a telephone call request, and send the telephone call request to the corresponding gateway device, wherein the telephone call request is delivered to the telephone terminal by using the gateway device;

a response signaling receiving unit, configured to receive answer response signaling forwarded by the gateway device, wherein the answer response signaling is returned by the telephone terminal to the gateway device in response to the telephone call request; and a signaling response unit, configured to return the remote access address to the gateway device in response to the answer response signaling, to control the gateway device to establish the multi-party voice call by using the remote access address.

26. The system according to claim 24, wherein the at least one processor further implements a channel establishment module and a call control module, the channel establishment module and the call control module running on a server corresponding to the remote access address, wherein the channel establishment module is configured to establish data channels with the calling side and the specified terminals, respectively, and the call control module is configured to control the calling side and the specified terminals to perform the multi-party voice call by using the data channels.

27. The system according to claim 26, wherein the call control module comprises:

a data stream receiving unit, configured to receive a data stream sent by any VoIP terminal in the multi-party voice call or a data stream sent by the telephone terminal by using the gateway device; and a forwarding processing unit, configured to perform forwarding processing on the data stream, so that the data stream is transmitted to a corresponding terminal by using a data channel.

28. The system according to claim 27, wherein multiple data streams are received, and the forwarding processing unit comprises:

a receiving-end determining subunit, configured to determine receiving ends of the multiple data streams, wherein the receiving ends comprise the VoIP terminal and/or the telephone terminal; and an adaptive audio mixing forwarding subunit, configured to: forward a data stream of the multiple data streams that corresponds to an receiving end when the receiving end is the VoIP terminal and supports audio mixing processing, and perform the audio mixing processing on the data stream to be forwarded and forward the processed data stream when the receiving end is the telephone terminal or the receiving end is the VoIP terminal and does not support the audio mixing processing, wherein the forwarded data stream is any one data stream or any combination of data streams.

29. The system according to claim 28, wherein the audio mixing processing performed on the telephone terminal comprises encoding in a telephone format, the forwarded data stream is a code stream supported by the telephone terminal, and the system further comprises the gateway device, wherein the gateway device is configured to receive the code stream supported by the telephone terminal, and deliver the code stream to a corresponding telephone terminal.

30. The system according to claim 28, wherein the adaptive audio mixing forwarding subunit comprises:

a data stream superimposition subunit, configured to: superimpose the data streams to be forwarded to output one data stream, and add identification information of the receiving end to the one output data stream when the receiving end is the telephone terminal or the receiving end is the VoIP terminal and does not support the audio mixing processing; and a forwarding execution subunit, configured to forward the one data stream that carries the identification information of the receiving end to the receiving end.

31. A real-time call system, comprising terminals capable of joining a multi-party voice call, the terminals comprising Voice over Internet Protocol (VoIP) terminals and a telephone terminal, the system further comprising:

a VoIP terminal configured to initiate a multi-party voice call request to the signaling server;

a signaling server configured to return a remote access address of a data server to the VoIP terminal that initiates the multi-party voice call request, initiate, to another terminal in the multi-party voice call, signaling exchange for establishing a call, and return the remote access address to a gateway device corresponding to another VoIP terminal and/or the telephone terminal by using the signaling exchange; and the gateway device corresponding to the VoIP terminals and/or the telephone terminal configured to establish data channels with the data server by using the remote access address, to perform the multi-party voice call.

* * * * *